United States Patent
Hunstable

(10) Patent No.: US 11,692,616 B2
(45) Date of Patent: Jul. 4, 2023

(54) CRANKSHAFT ASSEMBLY

(71) Applicant: Fred E. Hunstable, Granbury, TX (US)

(72) Inventor: Fred E. Hunstable, Granbury, TX (US)

( * ) Notice: Subject to any disclaimer, the term of this patent is extended or adjusted under 35 U.S.C. 154(b) by 0 days.

(21) Appl. No.: 17/688,724

(22) Filed: Mar. 7, 2022

(65) Prior Publication Data
US 2022/0268343 A1 Aug. 25, 2022

Related U.S. Application Data

(63) Continuation of application No. 17/023,735, filed on Sep. 17, 2020, now Pat. No. 11,268,599, which is a continuation of application No. 16/433,736, filed on Jun. 6, 2019, now Pat. No. 10,808,809, which is a continuation of application No. 15/691,382, filed on Aug. 30, 2017, now Pat. No. 10,352,414, which is a continuation of application No. PCT/US2016/022227, filed on Mar. 11, 2016.

(60) Provisional application No. 62/131,831, filed on Mar. 11, 2015.

(51) Int. Cl.
| | | |
|---|---|---|
| F16H 21/34 | (2006.01) | |
| F02B 75/32 | (2006.01) | |
| F01B 1/08 | (2006.01) | |
| F01B 9/02 | (2006.01) | |
| F02B 75/24 | (2006.01) | |
| F02B 75/04 | (2006.01) | |
| F16C 3/06 | (2006.01) | |
| F16H 7/06 | (2006.01) | |

(52) U.S. Cl.
CPC .............. *F16H 21/34* (2013.01); *F01B 1/08* (2013.01); *F01B 9/02* (2013.01); *F02B 75/045* (2013.01); *F02B 75/24* (2013.01); *F02B 75/32* (2013.01); *F16C 3/06* (2013.01); *F16H 7/06* (2013.01)

(58) Field of Classification Search
CPC .... F16H 21/34; F16H 7/06; F01B 1/08; F01B 9/02; F01B 9/026; F01B 7/04; F02B 75/045; F02B 75/24; F02B 75/32; F16C 3/06; F16C 3/22; F16C 3/24
See application file for complete search history.

(56) References Cited

U.S. PATENT DOCUMENTS

| | | | | |
|---|---|---|---|---|
| 1,612,917 A | * | 1/1927 | Grimes | F01B 9/02 123/197.1 |
| 2,677,280 A | | 5/1954 | Paulus | |

(Continued)

FOREIGN PATENT DOCUMENTS

| | | |
|---|---|---|
| DE | 102010027351 A1 | 1/2012 |
| GB | 190105129 A | 3/1902 |

(Continued)

OTHER PUBLICATIONS

EP Communication pursuant to Rules 70(2) and 70a(2) EPC, dated Oct. 19, 2018, by the EPO, re EP Patent App No. 16762688.6.
EP Exam Report, dated Jul. 5, 2021, by the EPO, re EP Patent App No. 16762688.6.
EP Exam Report, dated Nov. 6, 2019, by the EPO, re EP Patent App No. 16762688.6.

(Continued)

*Primary Examiner* — Jacob M Amick
(74) *Attorney, Agent, or Firm* — Bill R. Naifeh

(57) ABSTRACT

There is presented various embodiments disclosed in this application, including an improved crankshaft system using a load connecting member which provides a greater maximum torque angle than a conventional system, thereby improving efficiency and power.

12 Claims, 23 Drawing Sheets

(56) References Cited

U.S. PATENT DOCUMENTS

| | | | |
|---|---|---|---|
| 3,903,995 A * | 9/1975 | Irgens | B27B 17/0033 |
| | | | 123/196 R |
| 4,267,765 A | 5/1981 | Hedger | |
| 5,211,065 A | 5/1993 | Mandella | |
| 10,352,414 B2 | 7/2019 | Hunstable | |
| 10,808,809 B2 | 10/2020 | Hunstable | |
| 11,268,599 B2 | 3/2022 | Hunstable | |
| 2003/0183026 A1 | 10/2003 | Korniyenko et al. | |
| 2007/0044740 A1 | 3/2007 | Watanabe et al. | |
| 2007/0283909 A1 | 12/2007 | Hofbauer | |
| 2011/0146601 A1 | 6/2011 | Fisher | |
| 2013/0118442 A1 | 5/2013 | Brendel | |

FOREIGN PATENT DOCUMENTS

| | | |
|---|---|---|
| GB | 2495827 A | 4/2013 |
| RU | 2530670 C1 | 10/2014 |
| WO | 2005124124 A1 | 12/2005 |
| WO | 2016145424 A1 | 9/2016 |

OTHER PUBLICATIONS

Extended European Search Report, dated Oct. 2, 2018, by the EPO, re EP Patent App No. 16762688.6.

International Search Report and Written Opinion of the ISA/RU, dated Aug. 11, 2016, re International Application No. PCT/US2016/022227.

Notice of Allowance, dated Jun. 18, 2020, by the USPTO, re U.S. Appl. No. 16/433,736.

Notice of Allowance, dated Mar. 6, 2019, by the USPTO, re U.S. Appl. No. 15/691,382.

Notice of Allowance, dated Nov. 5, 2021, by the USPTO, re U.S. Appl. No. 17/023,735.

Office Action, dated Jan. 7, 2020, by the USPTO, re U.S. Appl. No. 16/433,736.

Office Action, dated May 11, 2021, by the USPTO, re U.S. Appl. No. 17/023,735.

Office Action, dated Oct. 15, 2018, by the USPTO, re U.S. Appl. No. 15/691,382.

\* cited by examiner

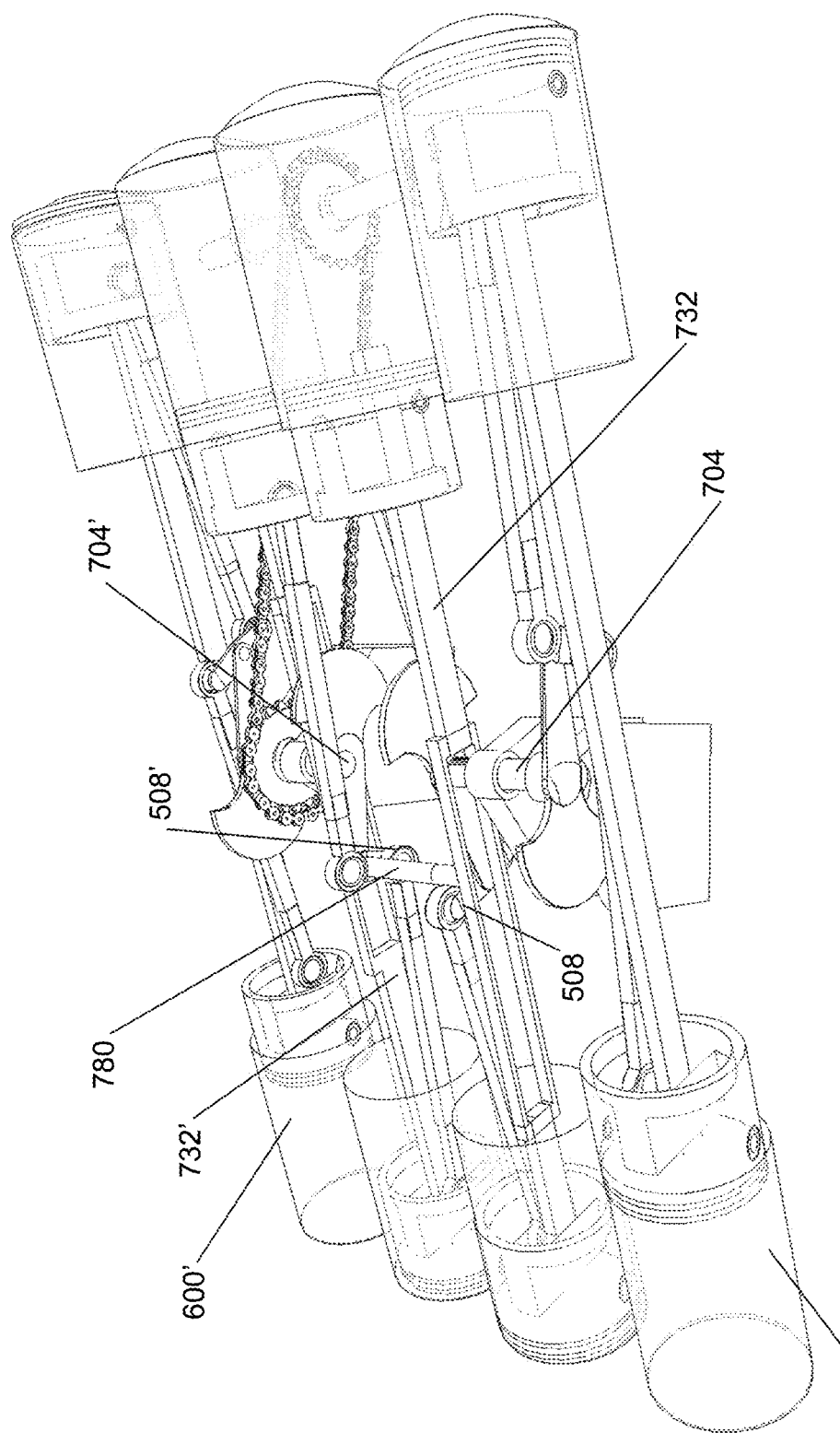

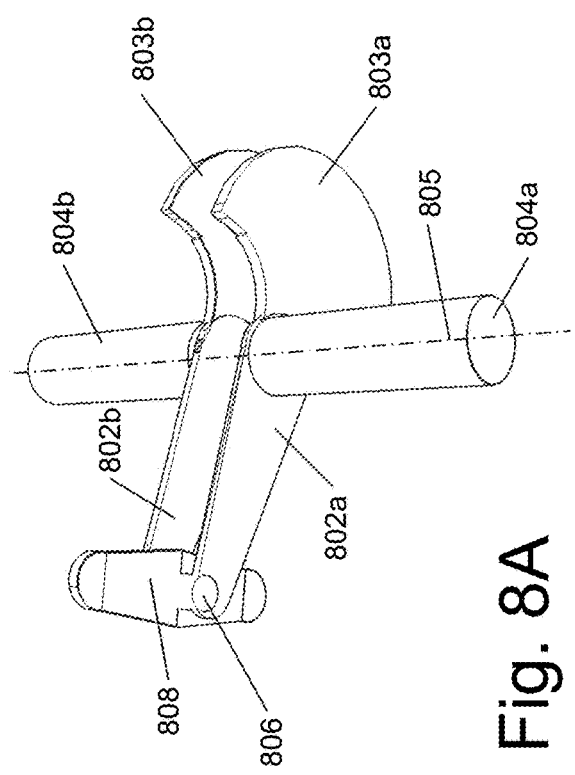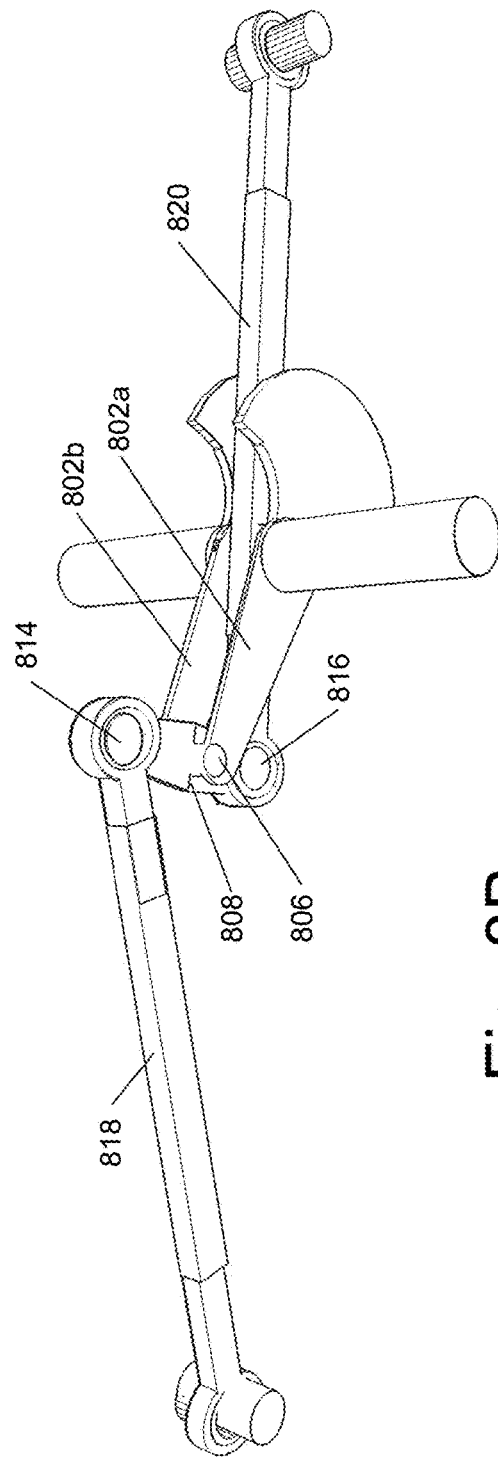

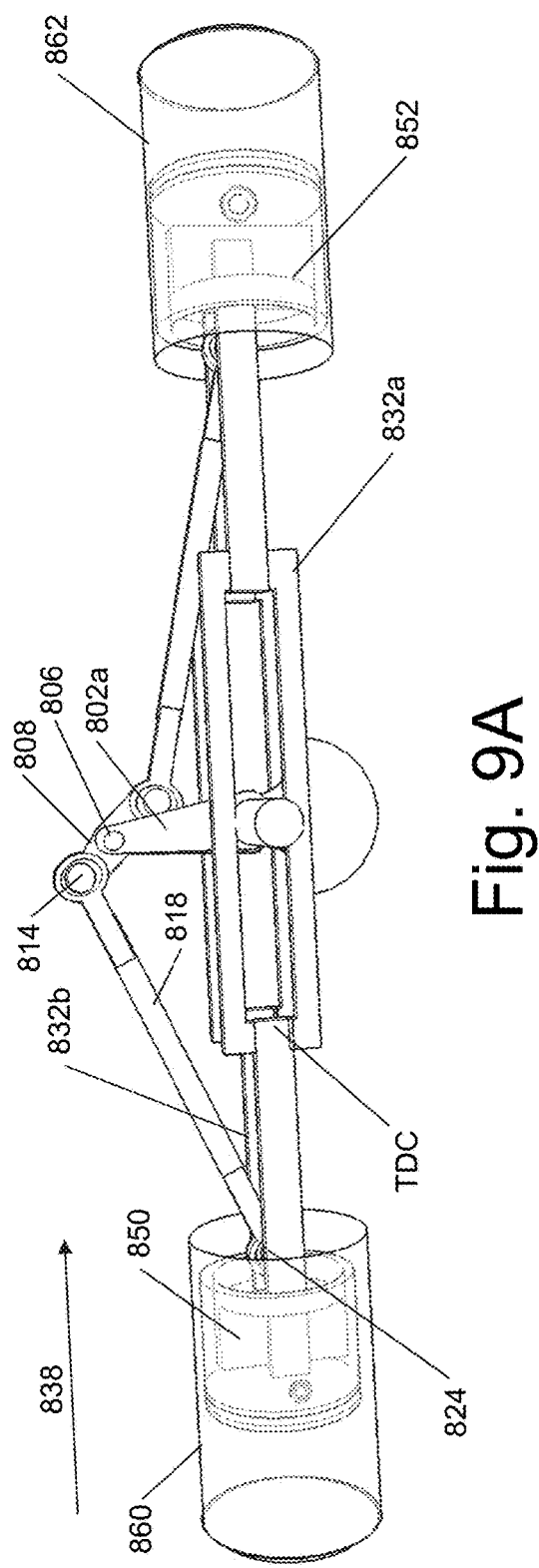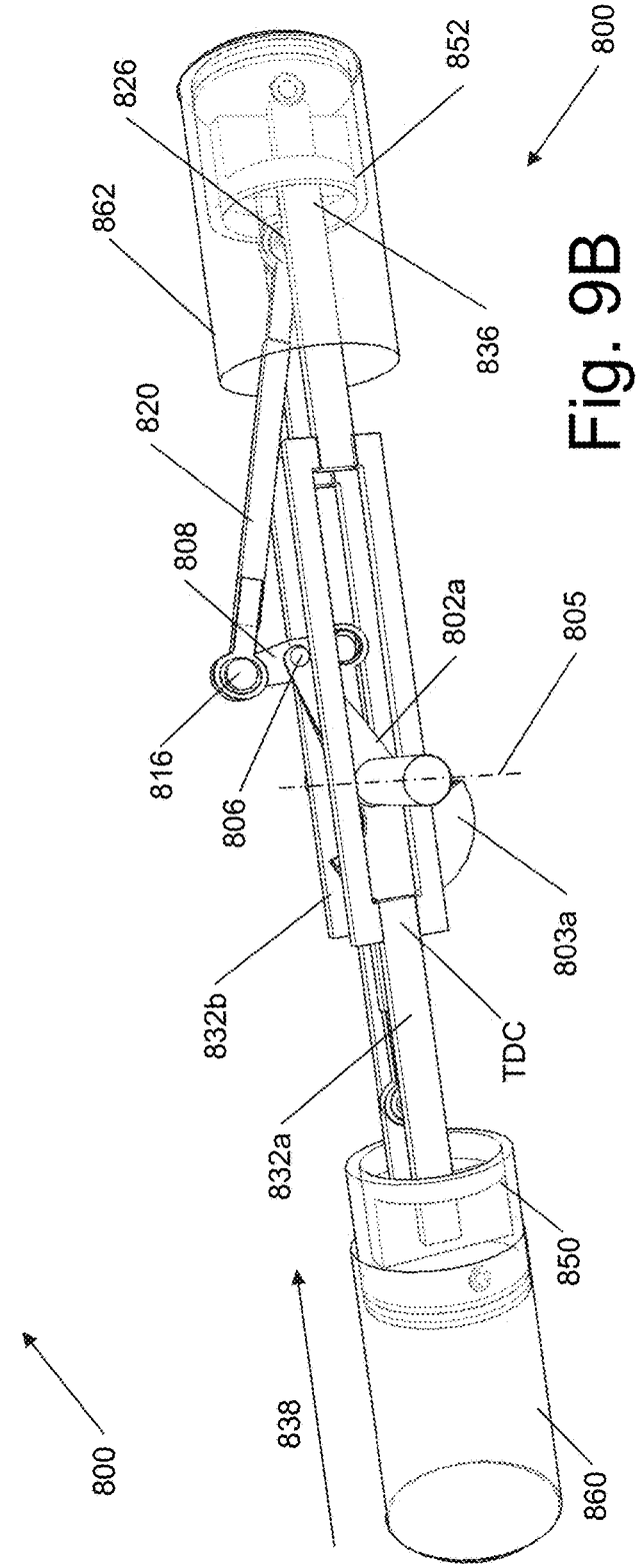

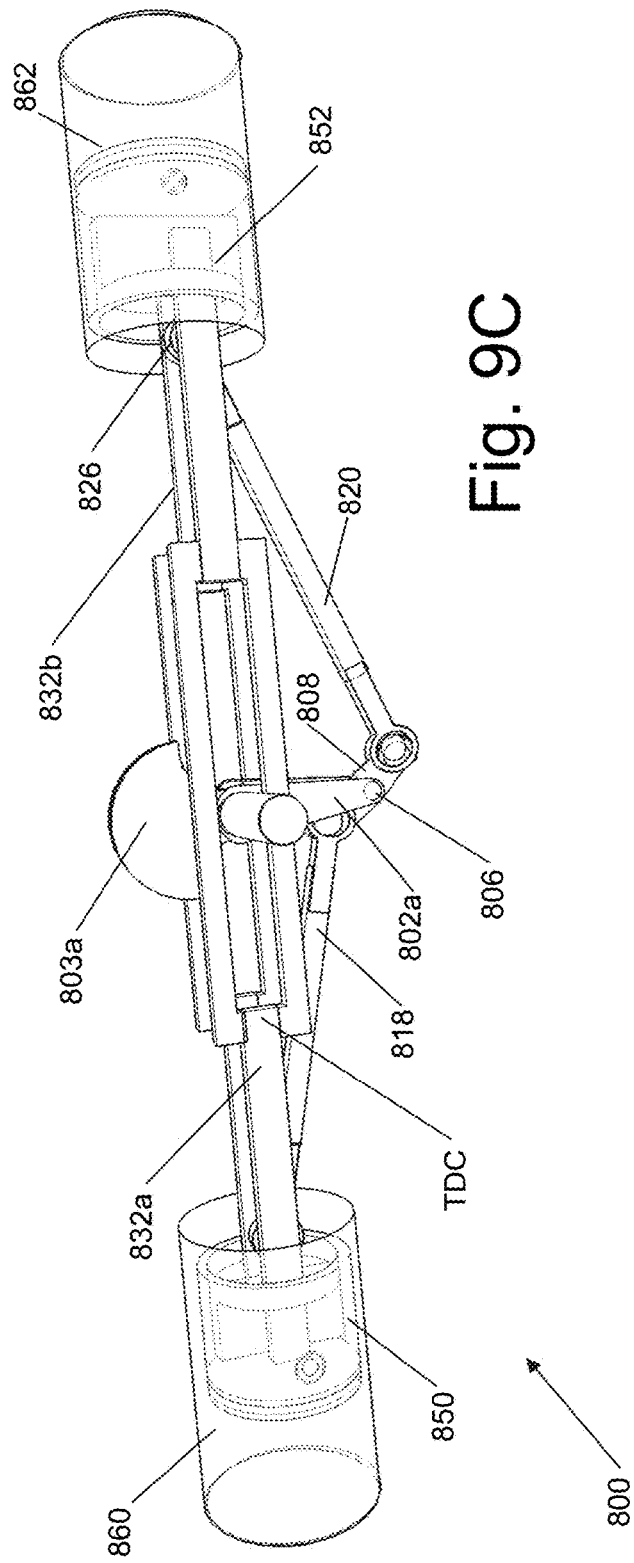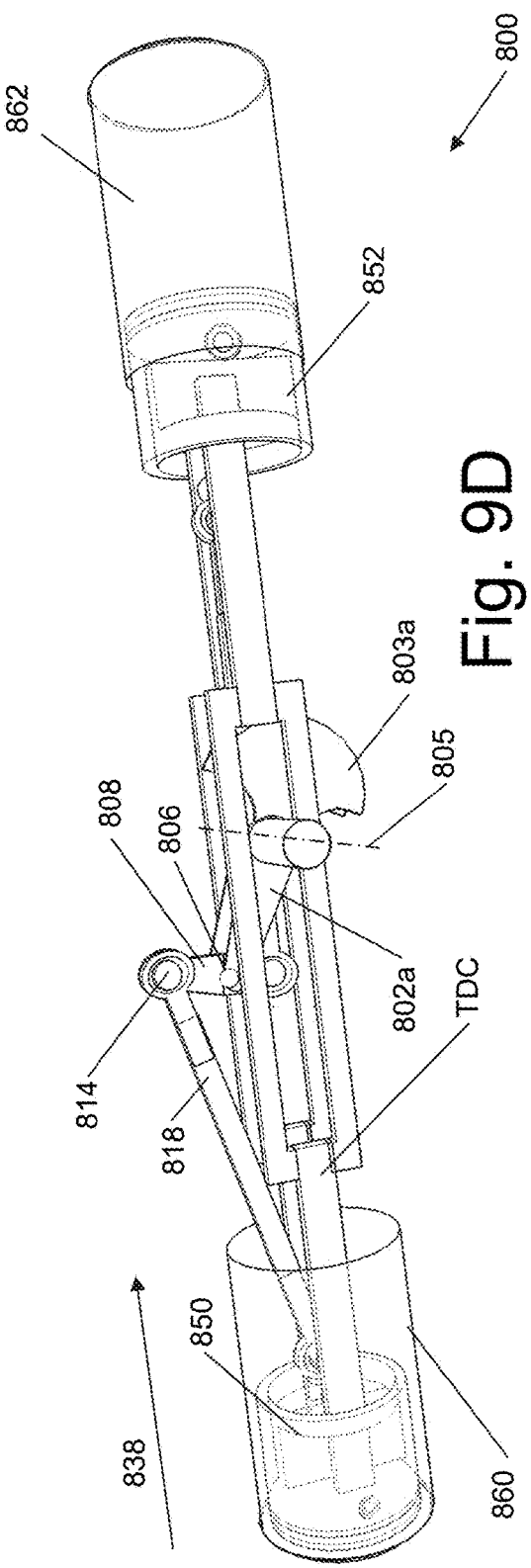

CRANKSHAFT ASSEMBLY

CROSS REFERENCE TO RELATED APPLICATIONS

This application is a continuation of U.S. patent application Ser. No. 17/023,735, filed Sep. 17, 2020, entitled "An Improved Crankshaft Assembly," which is a continuation of U.S. patent application Ser. No. 16/433,736, filed Jun. 6, 2019, now U.S. Pat. No. 10,808,809, entitled "An Improved Crankshaft Assembly," which is a continuation of U.S. patent application Ser. No. 15/691,382, filed Aug. 30, 2017, now U.S. Pat. No. 10,352,414, entitled "An Improved Crankshaft Assembly," which is a continuation of International Patent Application No. PCT/US2016/022227, filed Mar. 11, 2016, entitled "An Improved Crankshaft Assembly," which claims the benefit of the filing date of U.S. Provisional Application No. 62/131,831, filed Mar. 11, 2015, entitled "An Improved Crankshaft Assembly." The disclosures of which are incorporated herein by reference for all purposes.

TECHNICAL FIELD

The invention relates in general to crankshaft assemblies for converting linear motion into a rotary motion or vice versa.

BACKGROUND INFORMATION

The crankshaft, sometimes abbreviated to crank, is the part of an engine or other device that translates reciprocating linear piston motion into rotation. To convert the reciprocating motion into rotation, the crankshaft has "crank throws" or "crankpins", additional bearing surfaces whose axis is offset from that of the crank, to which the "big ends" of the connecting rods from each cylinder attach.

A crank is an arm attached at right angles to a rotating shaft by which reciprocating motion is imparted to or received from the shaft. It is used to convert circular motion into reciprocating motion, or vice-versa. The arm may be a bent portion of the shaft, or a separate arm or disk attached to it. Attached to the end of the crank by a pivot is a rod, usually called a connecting rod. The end of the rod attached to the crank moves in a circular motion, while the other end is usually constrained to move in a linear sliding motion.

The mechanical advantage of a crank, the ratio between the force on the connecting rod and the torque on the shaft, varies throughout the crank's cycle. Thus a good portion of the force applied to the crank is absorbed at the bearing surfaces and is not turned into a torque. This puts tremendous pressures on the bearing surfaces until such time that the torque angle improves allowing more of the force to be converted into a torque. These losses, most of which are converted into heat, are responsible for the lowered efficiencies of a crankshaft assembly and in particular in combustion engines that use crankshaft principles, such as pistons.

SUMMARY

In response to these and other problems, there is presented various embodiments disclosed in this application, including an improved crankshaft system using a load connecting member which provides a greater maximum torque angle than a conventional system, thereby improving efficiency and power.

Specifically, in certain embodiments there may be a crankshaft assembly comprising: a rotatable shaft having a center axis, a crank means positioned transversely to the center axis, wherein an interior portion of the crank means is fixedly coupled to the rotatable shaft, a load transfer member having a first end connecting pin, a second end connecting pin, and an interior connecting pin, wherein the interior connecting pin is rotatably coupled to the crank means, a first connecting rod having exterior end and an interior end, wherein the interior end of the first connecting rod is rotatably coupled to the first end connecting pin, and a second connecting rod having exterior end and an interior end, wherein the interior end of the second connecting rod is rotatably coupled to the second end connecting pin.

There may also be embodiments as described above wherein the crank means is a crank member having an interior end and an exterior end positioned transversely to the longitudinal axis, wherein the interior end is the interior portion and the exterior end is rotatably coupled to the interior connecting pin of the load transfer member.

There may also be embodiments as described above further comprising a counter weight coupled to the interior end of the crank means.

There may also be embodiments as described above wherein the crank means is a crank wheel.

There may also be embodiments as described above wherein the crank means is a first crank member and a second crank member each having an interior end and an exterior end, wherein each exterior end is positioned transversely to the center axis and each interior end is the interior portion, and each exterior end is rotatably coupled to the interior connecting pin of the load transfer member.

There may also be embodiments as described above wherein the distance between the first end connecting pin and the interior connecting pin of the load transfer member is greater than the distance between the interior connecting pin and the second end connecting pin of the load transfer member.

There may also be embodiments as described above further comprising a stabilizing member rotatably coupled to the exterior end of the first connecting rod and rotably coupled to the exterior end of the second connecting rod.

There may also be embodiments as described above wherein the stabilizing member comprises a center bearing portion slidingly coupled to the rotatable shaft.

There may also be embodiments as described above further comprising a second stabilizing member rotatably coupled to the exterior end of the first connecting rod and rotably coupled to the exterior end of the second connecting rod.

There may also be embodiments as described above, wherein the second stabilizing member comprises a second center bearing portion slidingly coupled to the rotatable shaft.

There may also be embodiments as described above, incorporated into an engine wherein the exterior end of the first connecting rod is rotatably coupled to a first piston and the exterior end of the second connecting rod is rotatably coupled to a second piston.

There may also be embodiments as described above, further comprising a second system of claim 1 wherein the crank means of the second system is rotated at an angle of 180 degrees with respect to the first system of claim 1.

There may also be a method of rotating a crankshaft, the method comprising: moving an exterior end of a first connecting rod along a first linear direction, moving an interior end of the first connecting rod rotatably coupled to a first connecting pin of a load transfer member, rotating the load transfer member about a first end connecting pin and about an interior connecting pin rotatable coupled to a crank means, rotating the crank means about the crankshaft, which in turn rotates the crankshaft about its center axis.

There may also be embodiments of the method as described above, further comprising: moving an exterior end of a second connecting rod along the first linear direction, moving an interior end of the second connecting rod rotatably coupled to a second connecting pin of the load transfer member, rotating the load transfer member about a second end connecting pin and about an interior connecting pin rotatable coupled to the crank means, rotating the crank means about the crankshaft, which in turn rotates the crankshaft about its center axis.

There may also be embodiments of the method as described above, further comprising moving a stabilizing member coupled to the first connecting rod and the second connecting rod.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

FIG. 7 is a perspective view of another aspect of an engine using the crankshaft system of the previous figures.

FIG. 8A is a portion of an alternative embodiment.
FIG. 8B is a portion of an alternative embodiment.

FIG. 9A is an isometric view of the embodiment of FIG. 8D, where the crankshaft is rotated at a first angle relative to TDC.

FIG. 9B is an isometric view of the embodiment of FIG. 9A, where the crankshaft is rotated at a second angle relative to TDC.

FIG. 9C is an isometric view of the embodiment of FIG. 9A, where the crankshaft is rotated at a third angle relative to TDC.

FIG. 9D is an isometric view of the embodiment of FIG. 9A, where the crankshaft is rotated at a fourth angle relative to TDC.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry, power supplies, or circuitry used to power certain components or elements described herein are omitted, as such details are within the skills of persons of ordinary skill in the relevant art.

When directions, such as upper, lower, top, bottom, clockwise, counter-clockwise, are discussed in this disclosure, such directions are meant to only supply relative and/or reference directions for the illustrated figures and for orientation of components in the figures. The directions should not be read to imply actual directions used in any resulting invention or actual use. Under no circumstances, should such directions be read to limit or impart any meaning into the claims.

Figure 1:
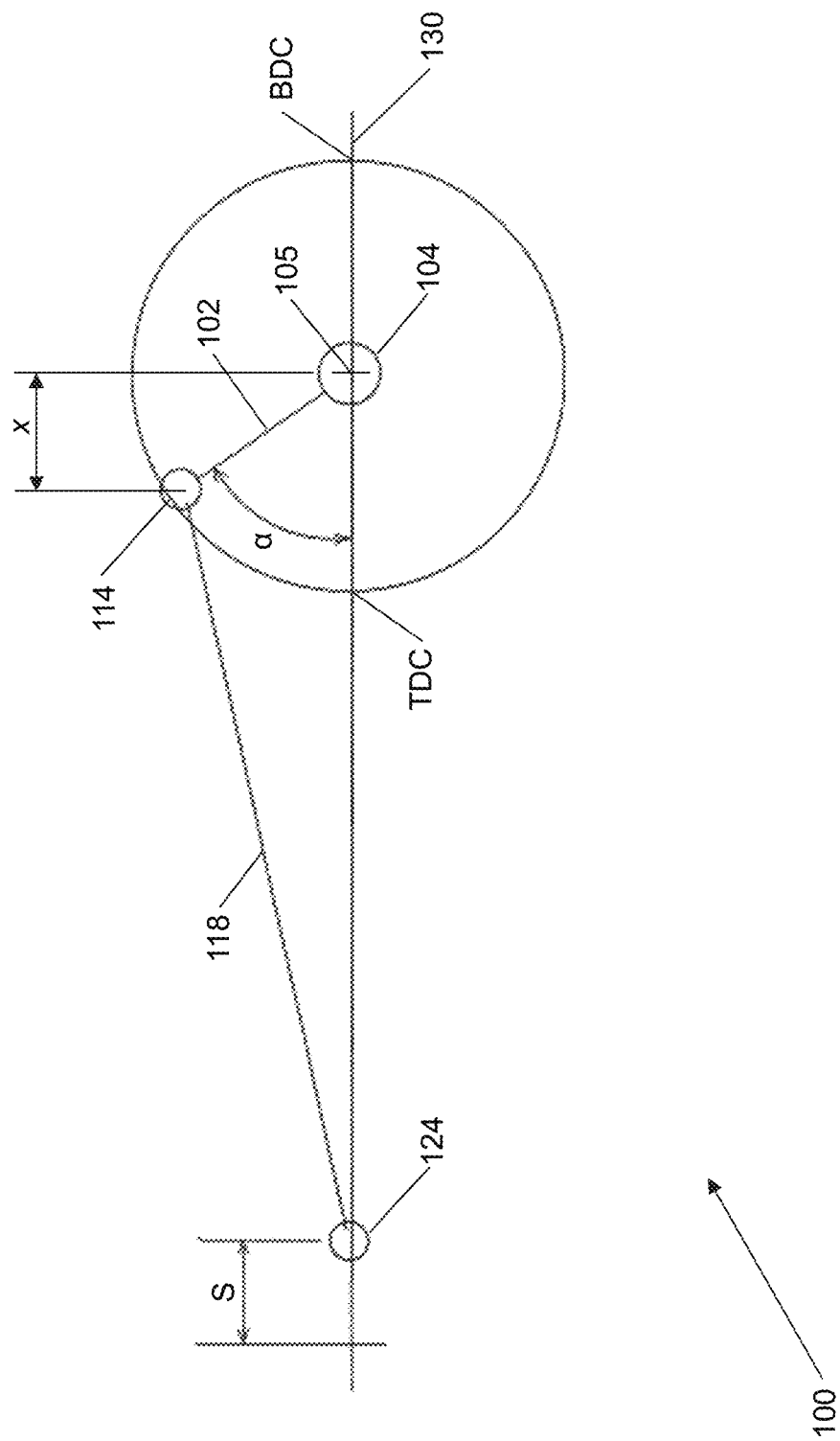
FIG. 1 is a schematic illustration of a conventional crankshaft system.

Turning now to FIG. 1, there is presented a schematic drawing of a typical crankshaft assembly 100 as used in numerous conventional mechanical applications including but not limited to piston driven combustion engines. FIG. 1 illustrates a crank 102 having an interior end radially attached a right angle to a rotating shaft or crankshaft 104. The crankshaft 104 rotates about its own center or longitudinal axis 105 which is normal to the plane of FIG. 1. Constrained within the plane of the illustration is a longitudinal axis 130 which intersects the center axis 105. The exterior end of the crank 102 is attached to a first or crank end of a connecting rod 118 via a crank pin 114.

A second or piston end of the connecting rod 118 may be rotatably coupled to a piston pin 124, which in turn may be coupled to a piston within a cylinder or a laterally restrained member (not shown) which in turn is coupled to a driving device or a driven device (such as a piston within a cylinder). In either case, in this embodiment, the piston pin 124 is laterally restrained and thus may only travel in a direction along the longitudinal axis 130.

The lateral displacement "S" of the piston pin 124 along the longitudinal axis 130 as the crank 102 rotates about the center axis 105 of the crankshaft 104 is approximately proportional to the cosine of the angle of rotation a of the crank 102, when it is measured from a reference point, which in this embodiment, is along the longitudinal axis 130 and is closest to the piston pin. Such a reference point is known as "top dead center" (TDC).

The reciprocating motion created by a steadily rotating crank and connecting rod is approximately simple harmonic motion. This motion can be generally expressed as the formula: $x = \iota + r \cos \alpha$, where x is the lateral component of the distance between the end of the connecting rod 118 (e.g., crank pin 114) and the center axis 105 of the crankshaft 104, $\iota$ is the length of the connecting rod 118, r is the length of the crank 102, and a is the rotational angle of the crank 102 between the reference point or top dead center (TDC) and the crank pin 114. (Technically, the reciprocating motion of the connecting rod 118 departs slightly from sinusoidal motion due to the changing angle of the connecting rod during the cycle.)

Figure 4B:
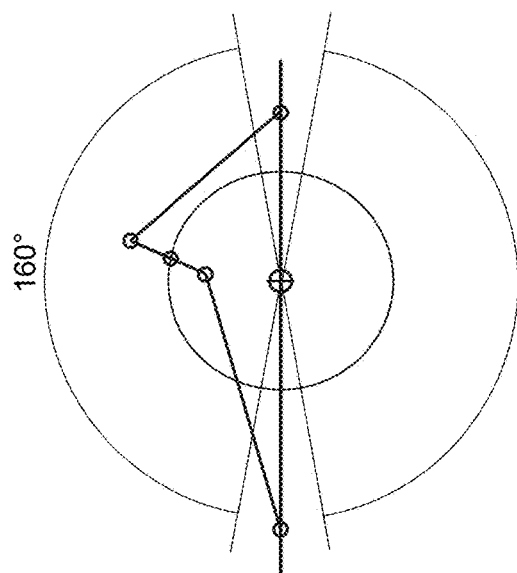
FIG. 4B illustrates a maximum torque angle in certain embodiments of this disclosure.
Figure 4D:
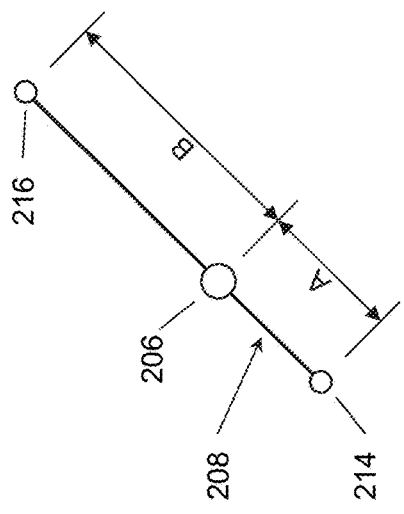
FIG. 4D is a conceptual line drawing of a load transfer member where the proportions between the connecting pins and the interior crank pin vary.
Figure 4A:
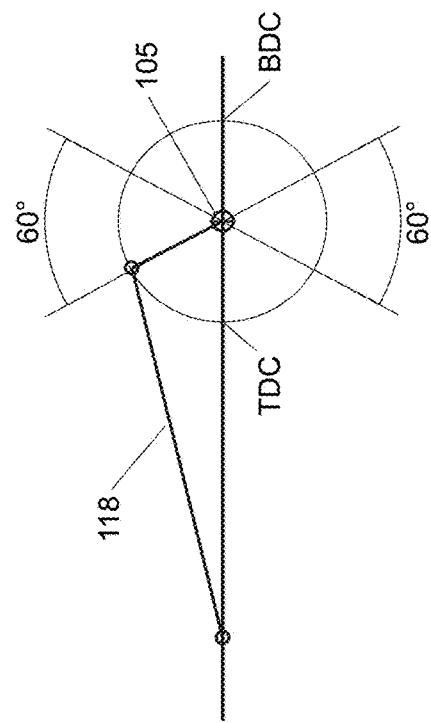
FIG. 4A illustrates a maximum torque angle area of a conventional crankshaft system.

The mechanical advantage of the crank 102 (e.g., the ratio between the force on the connecting rod 118 and the torque on the crankshaft 104) varies throughout the crank's cycle. The relationship between the two may be approximately represented by the formula: $\tau = Fr \sin \iota$, where $\iota$, is the torque and F is the force on the connecting rod 118. Thus, for a given force on the crank 102, the torque is maximum at crank angles of $\alpha = 90°$ or 270° from TDC. Of course, around these crank angles there is a rotation path that creates two "areas" of maximum torque of approximately 60 degrees as illustrated in FIG. 4A. In other words, the rotation path within these 60 degree areas create greater torque than that outside of these areas due to the geometrical relationship the crank pin 114 as it rotates around the center axis 105.

Turning back to FIG. 1, when the crank 102 is driven by the connecting rod 118, a problem arises when the crank is aligned with the longitudinal axis 130 (either at top dead center "TDC" (0°) or bottom dead center or "BDC" which is 180° from TDC). At these points in the crank's cycle, a force on the connecting rod 106 causes no torque on the crank 102. Therefore if the crank 102 is stationary and happens to be at one of these two points, the crank cannot be started moving by the connecting rod 106. To compensate for these geometric situations of no torque, in most piston engines, for instance, the fuel inside the piston cylinder (not shown) is ignited before or after the crank rotation is at TDC or BDC in order to provide enough momentum to power through piston through these positions. Thus, the areas around TDC and BDC are geometric areas of no or low torque.

Figure 2:
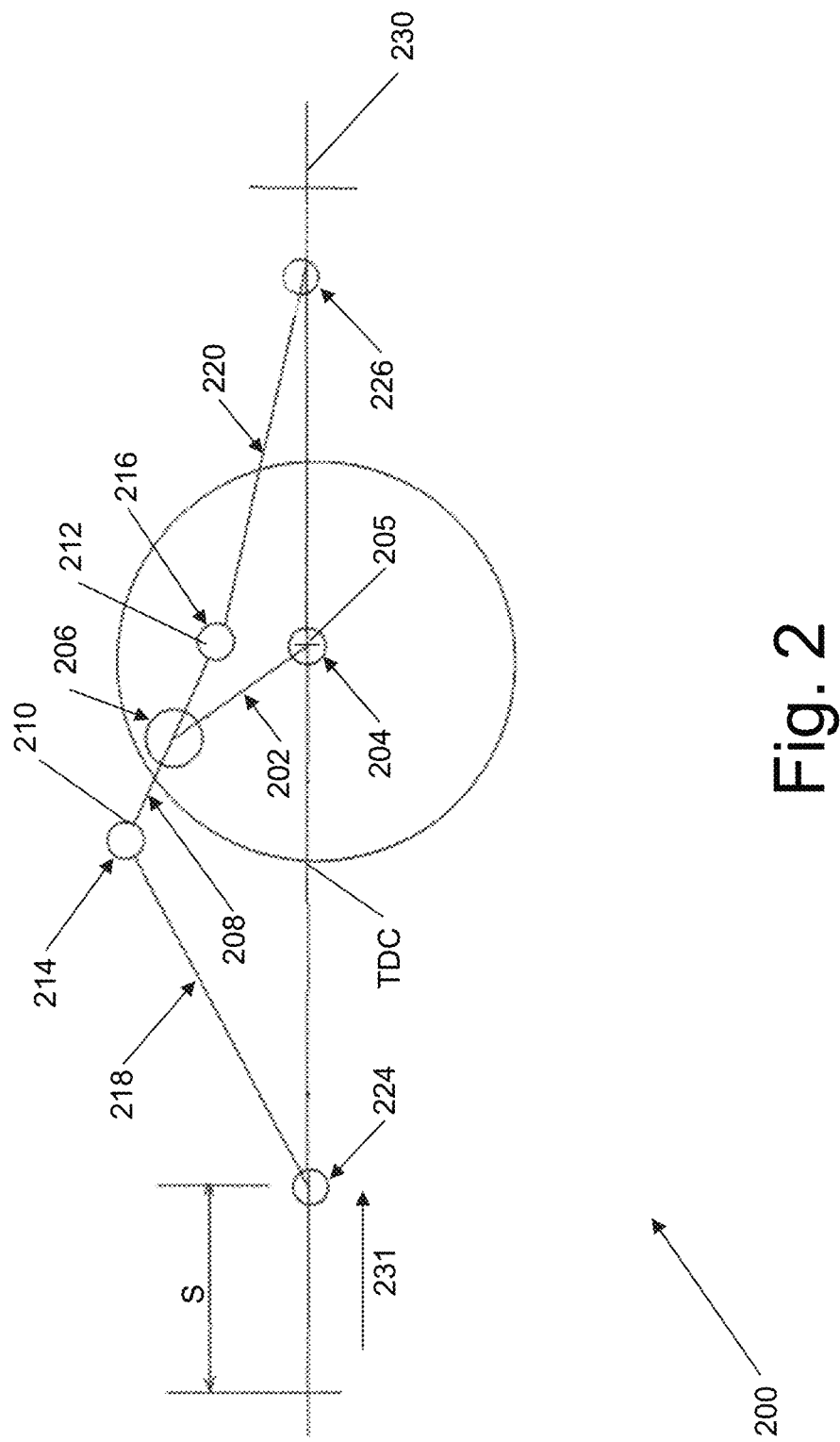
FIG. 2 is a schematic illustration of one embodiment of a crankshaft system according to one aspect of the present invention.
Figure 2A:
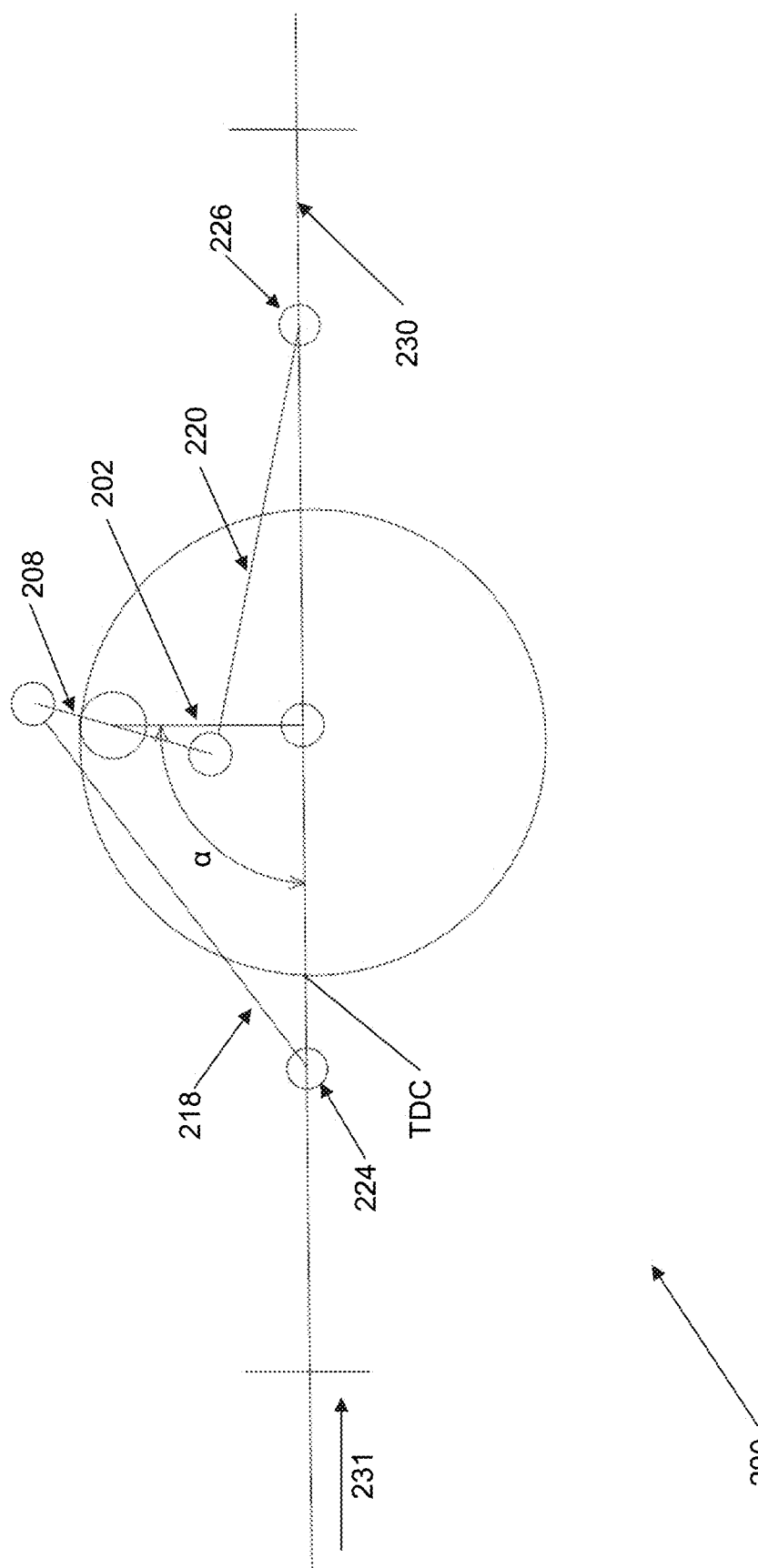
FIG. 2A is a schematic illustration of one embodiment of a crankshaft system, where the crankshaft is rotated at a first angle.

Turning now to FIGS. 2 and 2a, there is illustrated a conceptual view of an improved crankshaft system or assembly 200. FIG. 2 illustrates a crank 202 having an interior end radially attached at a right angle to a rotatable shaft or crankshaft 204. The crankshaft 204 rotates about its own center or a longitudinal axis 205 which is normal to the plane of the illustration. Constrained within the plane of the illustration and intersecting the center axis 205 is a longitudinal axis 230.

An exterior end of the crank 202 is rotatably coupled to an interior pin or crank pin 206 of a load transfer member 208. A first end 210 of the load transfer member 208 may be rotatably coupled to a first connecting rod member 218 via a connecting pin 214. The opposing end or second end 212 of the load transfer member 208 may be coupled to a second connecting rod member 220 via a connecting pin 216. The connecting pin 216 rotatably couples the load transfer member 208 to a second connecting rod 220.

The external or piston end of the connecting rod 218 may be rotatably coupled to a first piston pin 224, which in turn may be coupled to a piston or a laterally restrained member (not shown) which in turn is coupled either a driving device or a driven device. In either case, the piston pin 224 is laterally restrained and thus may only travel in along a longitudinal axis 230. Similarly, the external or piston end of the connecting rod 220 may be rotatably coupled to a second piston pin 226, which in turn may be coupled to a second piston or a laterally restrained member (not shown) which in turn is coupled to either a driving device or a driven device. In either case, the piston pin 226 is laterally restrained and thus may only travel in along a longitudinal axis 230.

By affixing two connecting rod pins 214 and 216 connected by means of a load transfer member 208, it is possible to convert this linear motion of the piston pins 224 and 226 into a rotary motion of the crankshaft 204. This arrangement provides an optimum torque angle throughout most of the stroke. The force applied to the linear connecting rod 218 allows a positive torque transfer while maintaining an optimum torque angle though approximately 160 degrees of crankshaft revolution (see FIG. 4b). This is a more efficient use of input force than the roughly 60 degree maximum torque angle in conventional crankshaft designs (see FIG. 1 and FIG. 4a).

FIG. 2 is schematic illustration of the system 200 where the angle α (between the TDC and longitudinal axis of the crank 202) is illustrated as less than 90 degrees. For example, as a lateral force in a first direction 231 is applied to the piston pin 224, that force is transferred to the first connecting rod member 218, which in turn transfers a force to the load transfer member 208. Because the load transfer force member 208 is coupled to the crank 202 via the crank pin 206, the crank 202 rotates about the center axis 205 at an angle α.

In FIG. 2a, the crank 202 has been rotated until the angle α is approximately 90 degrees from TDC. As illustrated in FIG. 2a, although the longitudinal axis of the crank 202 has been rotated approximately 90 degrees from the longitudinal axis 230 or TDC, the member 208 may be skewed due to the imbalance of forces applied to it from the first connecting rod member 218 and the second connecting rod member 220. Both the first connecting rod member 218 and the second connecting rod member 220 share the load on the load transfer force member 208 in a lateral direction. One member is pushing and the other member is pulling. This limits the applied force on each pivot point while transferring the full force to the crankshaft 204 via the crank 202.

Figure 2B:
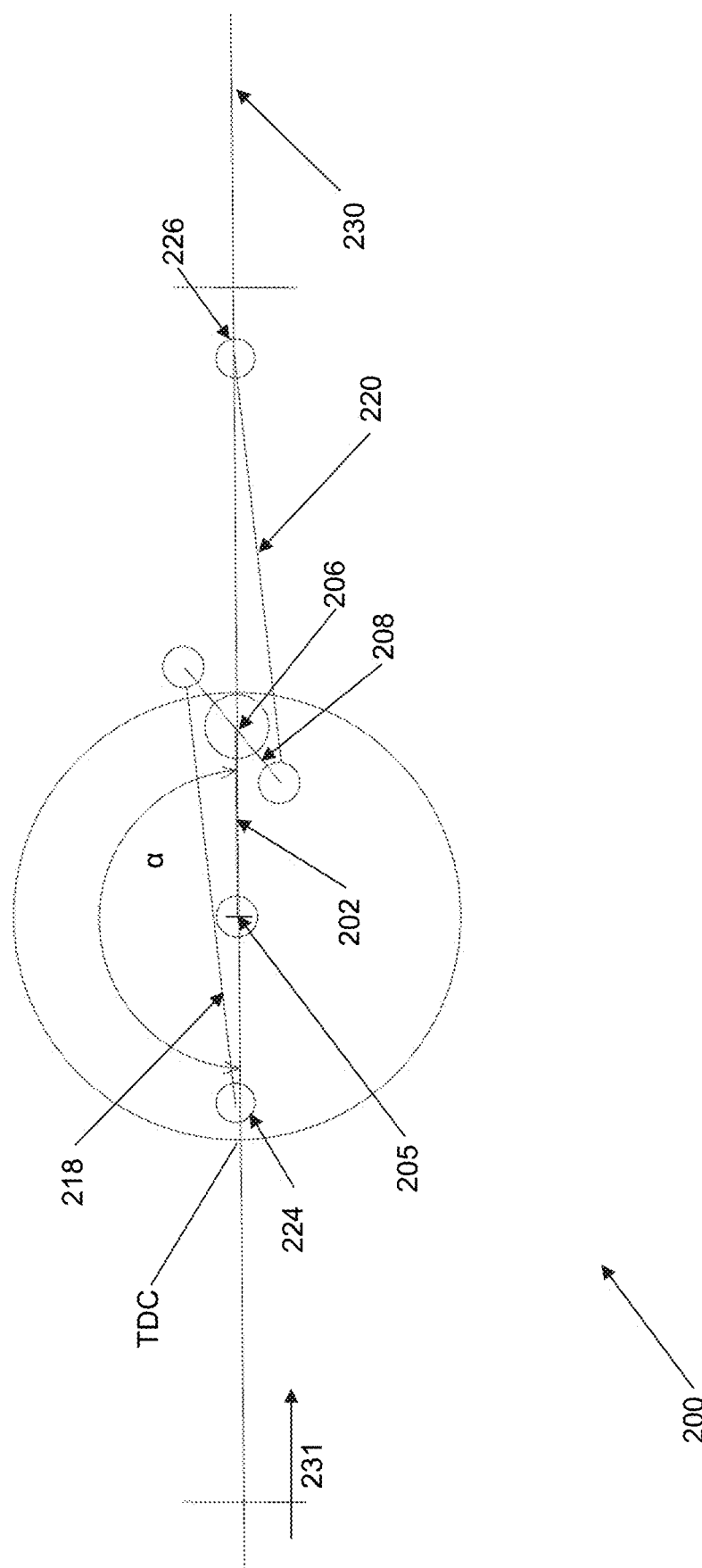
FIG. 2B is a schematic illustration of one embodiment of a crankshaft system, where the crankshaft is rotated at a second angle.

As the lateral force continues to be applied to the piston pin 224 in the direction 231, that force is transferred to the first connecting rod member 218, which in turn transfers a force to the load transfer member 208. Because the load transfer force 208 is coupled to the crank 202, the crank 202 rotates about an angle α. In FIG. 2b, the crank 202 has been rotated until the angle α is approximately 180 degrees from TDC. As illustrated in FIG. 2b, although the longitudinal axis of the crank 202 is approximately aligned with the longitudinal axis 230, the member 208 may be skewed due to the geometric constraints of the system 200.

Figure 2C:
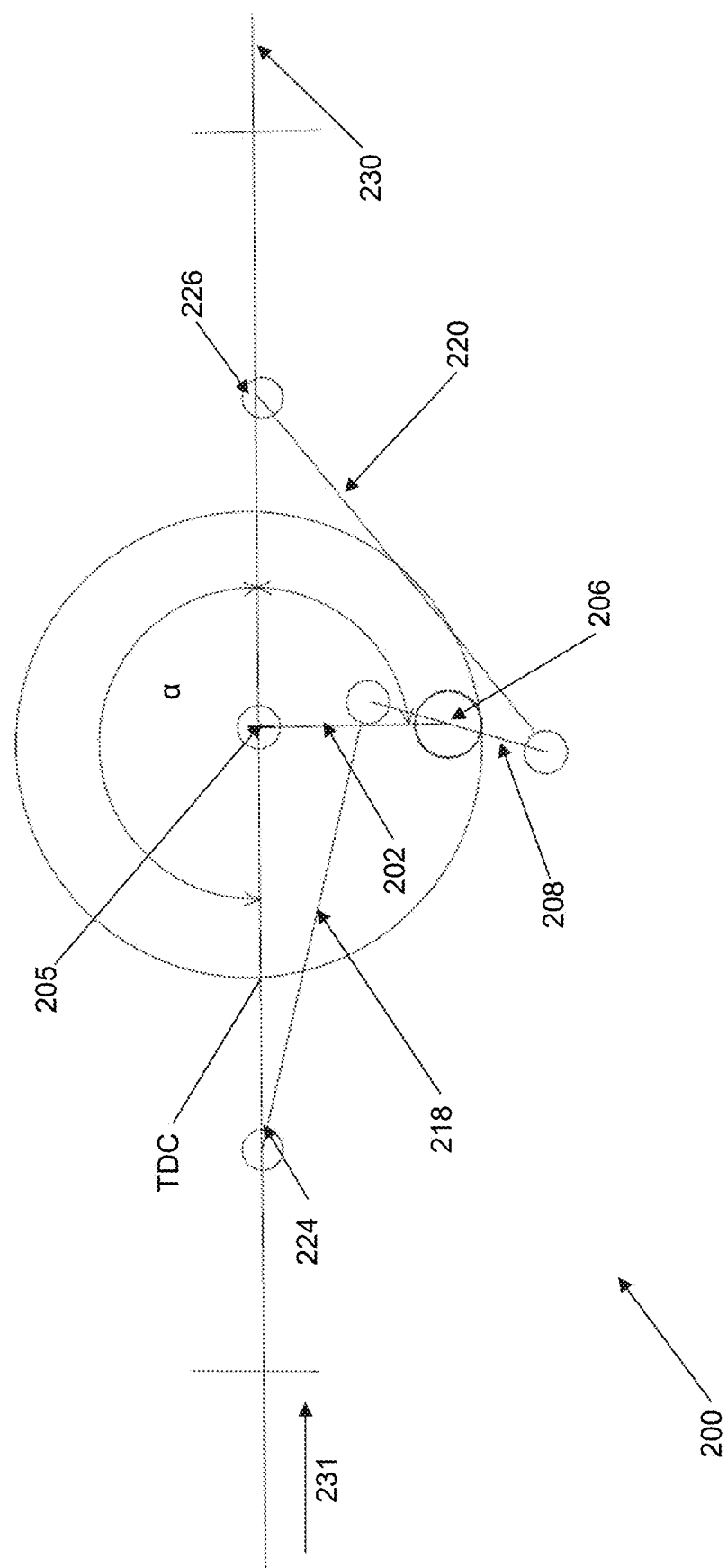
FIG. 2C is a schematic illustration of one embodiment of a crankshaft system, where the crankshaft is rotated at a third angle.

As the momentum of the load transfer member 208 causes the load transfer member to continue to rotate, the crank pin 206 continues to rotate about the center axis 205. In some embodiments, an opposing force (in a direction opposite to direction 231) may also be applied on the second piston pin 226 (either before or after the crank 202 is aligned with the longitudinal axis 230). If an opposing force is applied, then that opposing force is transferred to the second connecting rod member 220, which in turn transfers a force to the load transfer member 208. Because the load transfer force member 208 is coupled to the crank 202, the crank 202 continues to rotate about an angle α. In FIG. 2c, the crank 202 has been rotated until the angle α is approximately 270 degrees from TDC. As illustrated in FIG. 2c, although the longitudinal axis of the crank 202 is approximately −90 degrees (or 270 degrees) from the longitudinal axis 230, the member 208 may be skewed due to the geometric constraints of the system 200 and/or the imbalance of forces from the first connecting rod member 218 and the second connecting rod member 220.

Figure 2D:
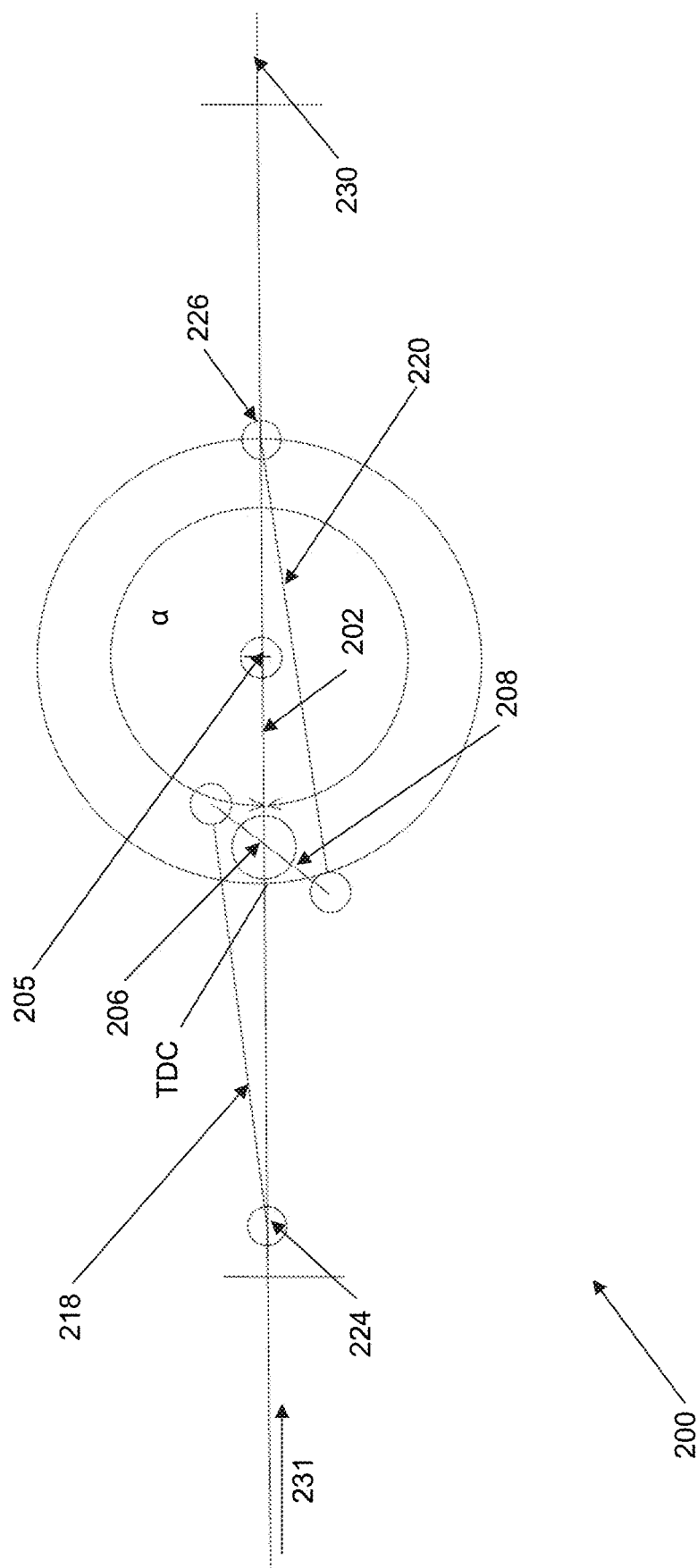
FIG. 2D is a schematic illustration of one embodiment of a crankshaft system, where the crankshaft is rotated at a fourth angle.

As the opposing force continues to be applied on the second piston pin 226, the crank 202 is rotated to the configuration illustrated in FIG. 2d where the crank 202 is now aligned with the longitudinal axis 230 at TDC. As the momentum of the load transfer member 208 continues to cause the crank pin 206 to rotate about the center axis 205. Additionally, a force in the direction of 231 may also be applied on the first piston pin 224 (either before or after the crank 202 has been aligned with the longitudinal axis 230). The applied force is transferred to the first connecting rod member 218, which in turn transfers a force to the load transfer member 208. Because the load transfer force member 208 is coupled to the crank 202, the crank 202 continues to rotate about an angle α. In FIG. 2d, the crank 202 has been rotated until the angle α is approximately 360 degrees from TDC. As illustrated in FIG. 2d, although the longitudinal axis of the crank 202 is approximately aligned with the longitudinal axis 230, the member 208 may be skewed due to the geometric constraints of the system 200. As the member 208 continues to rotate about the center axis 205, the crank 202 will be rotated until angle α is once again 90 degrees as illustrated in FIG. 2A. The process then repeats itself in an almost harmonic manner as alternative forces are applied to either the pin 224 or the pin 226 as alternate forces are applied to either the pin 224 or the pin 226 by a driving mechanism as will be explained below.

Figure 4C:
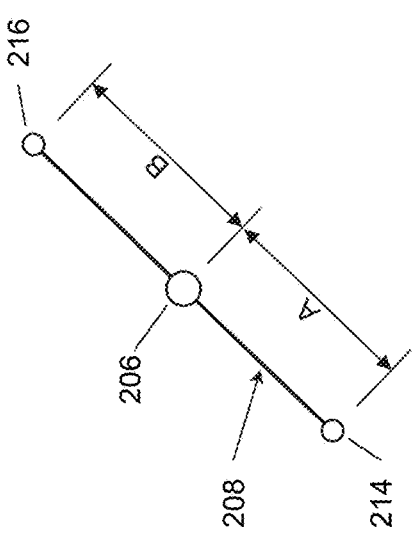
FIG. 4C is a conceptual line drawing of a load transfer member where the proportions between the connecting pins and the interior crank pin are generally equal.

As discussed above, the load transfer member 208 rotatably couples the crank 202 to the connecting members 218 and 220 via the crank pin 206, the connecting pin 214, and the connecting pin 216, respectively. A conceptual line drawing of the load transfer member 208 and the pins 206, 214, and 216 is illustrated in FIG. 4C. The longitudinal distance between the end connecting pin 214 and the interior crank pin 206 is labeled as distance "A." Similarly, the longitudinal distance between the interior crank pin 206 and connecting pin 216 is labeled as distance "B."

In certain embodiments, the load transfer member 208 may be illustrated with the proportions between distance A and distance B as generally equal—as illustrated in FIG. 4C. In other embodiments, the distance A and B varies. For instance, in certain embodiments, the distance B may be twice the distance as the distance A—as illustrated in FIG. 4D. In yet other embodiments, the distance A may be twice the distance B. Varying the proportions between A to B of the load transfer member 208 changes the torque angle which allows a greater torque to be transferred to the crankshaft.

Figure 3A:
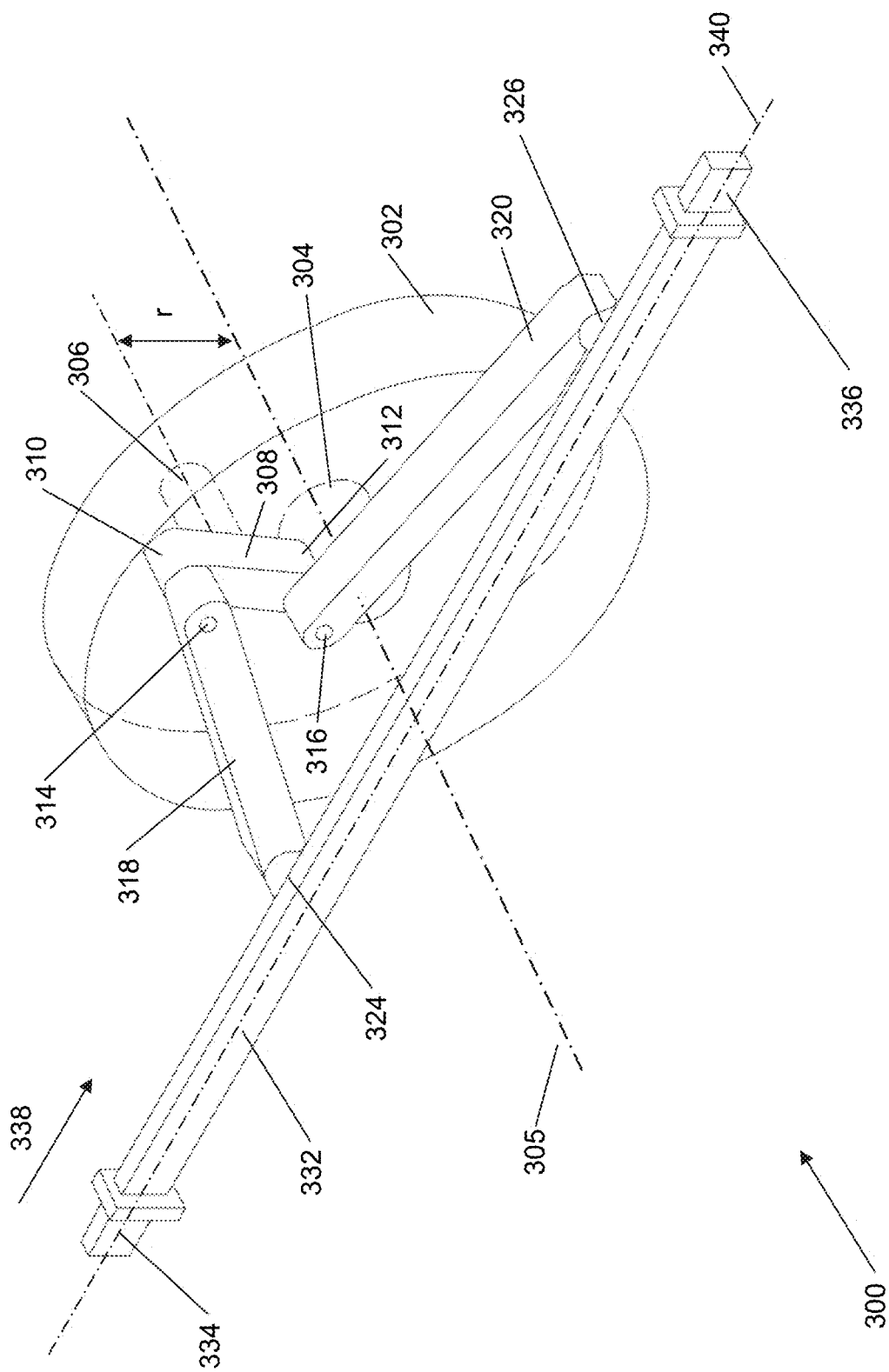
FIG. 3A is an isometric view of one embodiment of a crankshaft system, where the crankshaft is rotated at a first angle.

FIG. 3a illustrates an isometric view of a system 300 which employs the principles of the assembly 200 where the angle α (between the TDC and a crank wheel pin 306) is 90 degrees. Rather than employing a traditional crank (such as crank 202 of FIG. 2), the system 300 employs a crank wheel 302 which rotates about its center axis 305. In certain embodiments, a shaft or crankshaft 304 can also be concentrically positioned about the center axis 305 and fixedly coupled to the crank wheel 302. In certain embodiments, the crank wheel 302 provides momentum to assist in rotating through geometric positions of low torque as discussed above.

An interior or crank wheel pin 306 is rotatably positioned within the crank wheel 302 with its axis of rotation positioned at a radius "r" with respect to the center axis 305 (which corresponds to the length "r" of the crank 102 or 202 of FIGS. 1 and 2). In certain embodiments, the crank wheel pin 306 is rotatably coupled to a load transfer member 308 at approximately at the midpoint of the load transfer member. In yet other embodiments, the crank wheel pin 306 may be positioned away from the midpoint of the load transfer member 308. A first end 310 of the load transfer member 308 may be rotatably coupled to a first connecting rod member 318 via a connecting pin 314. The opposing end or second end 312 of the load transfer member 308 may be coupled to a second connecting rod member 320 via a connecting pin 316. In operation of certain embodiments, both the first connecting rod member 318 and the second connecting rod member 320 exert forces on the load transfer force member 308. One connecting rod member is pushing and the other connecting rod member is pulling. This limits the applied force on each pivot point while transferring the full force to the crankshaft 304 via the crank wheel 302.

An external or piston end of the connecting rod 318 may be rotatably coupled to a first piston pin 324, which in turn may be coupled to stabilizing member 332 which in turn may be coupled to a piston or either a driving device or a driven device (not shown). For instance, a first end 334 of the stabilizing member 332 may couple to a piston (not shown). In either case, the piston pin 324 is laterally restrained by the stabilizing member 332 and thus may only travel in along a longitudinal axis 340 of the stabilizing member. Similarly, the external or piston end of the second connecting rod 320 may be rotatably coupled to a second piston pin 326, which in turn may be coupled to the stabilizing member 332. A second or opposing end 336 of the stabilizing member 332 in turn may be coupled to another piston or either a driving device or a driven device (not shown). In either case, the piston pin 326 is also laterally restrained and thus may only travel in along the longitudinal axis 340 of the stabilizing member 332.

In certain embodiments, a driving member (not shown) such as a first piston within a cylinder may be coupled to the end 334 of the stabilizing member 332. As the fuel in the cylinder ignites, the pressure in the cylinder causes the piston to move in a direction 338. The movement of the piston in the direction 338 exerts a lateral force on the end 334 of the stabilizing member 332, which in turn exerts a lateral force on the first connecting member 318 via the connecting pin 324. The connecting member 318, in turn transfers a force to the load transfer member 308. Because the load transfer force member 308 is coupled to the crank wheel 302 via the crank wheel pin 306, the crank wheel 302 also rotates about an angle with respect to the center axis 305. In FIG. 3A, the crank wheel 302 and the crank wheel pin 306 have been rotated until the angle of rotation is approximately 90 degrees from TDC or the longitudinal axis 340 of the stabilizing member 332.

Figure 3B:
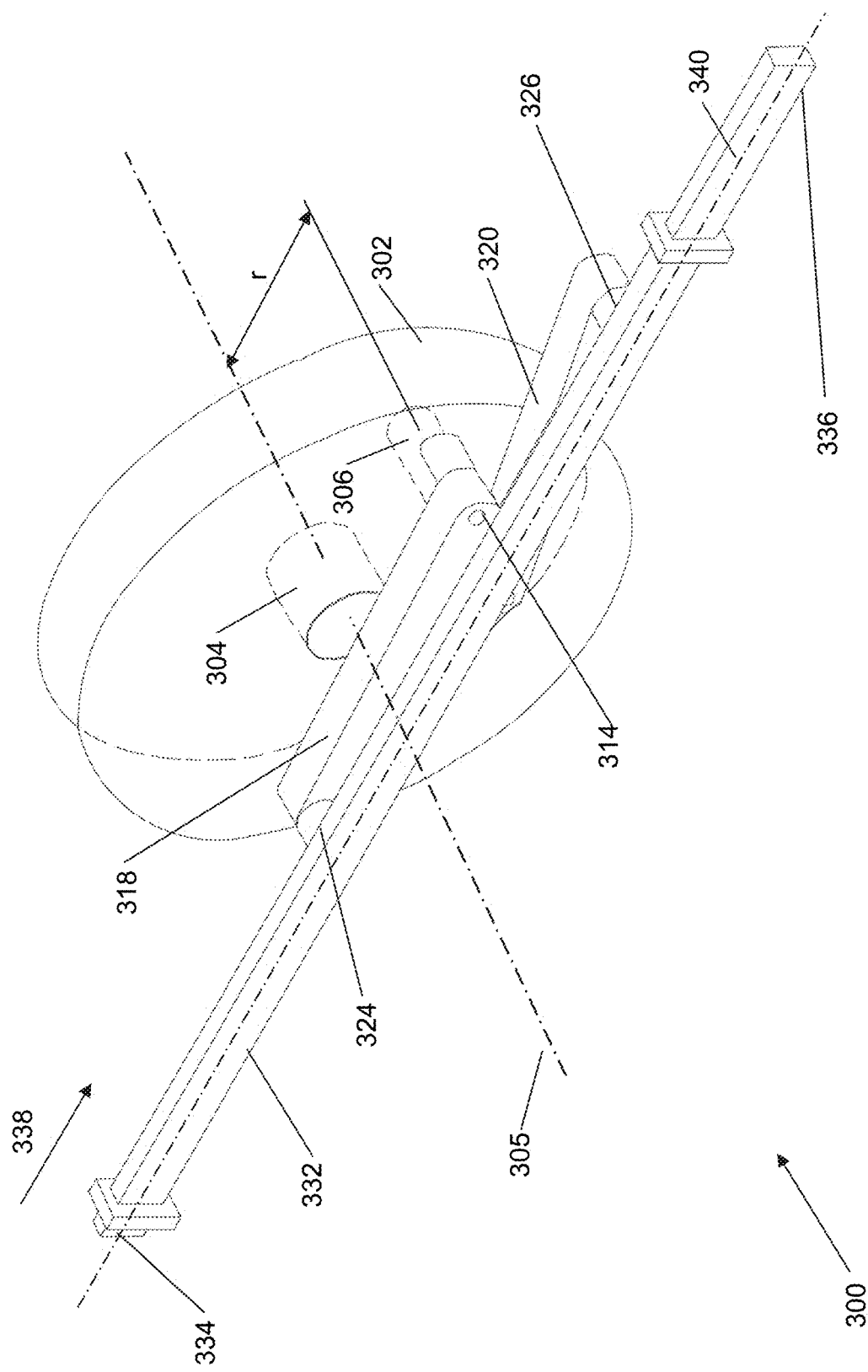
FIG. 3B is an isometric view of one embodiment of a crankshaft system, where the crankshaft is rotated at a second angle.

In FIG. 3B, the crank wheel 302 and the crank wheel pin 306 have been rotated until the angle of rotation is approximately 180 degrees from the TDC or longitudinal axis 340 of the stabilizing member 332. As illustrated in FIG. 3B, although the crank wheel pin 306 is approximately aligned with the longitudinal axis 340, the load transfer member 308 may be skewed due to the geometric constraints of the system 300.

The momentum of the crank wheel 302 causes the crank wheel pin 306 to continue to rotate about the center axis 305. In some embodiments, a second driving member (not shown) such as a second piston within a second cylinder may be coupled to the end 336 of the stabilizing member 332. As the fuel in the second cylinder ignites, the pressure in the second cylinder causes the second piston to move in opposite or opposing the direction 338. The opposite movement of the second piston in the opposing direction exerts a lateral opposing force on the end 336 of the stabilizing member 332, which in turn exerts a lateral opposing force on the second connecting member 320 via the connecting pin 326. In turn, the second connecting member 320 transfers a force to the load transfer member 308. Because the load transfer force member 308 is coupled to the crank wheel 302, the crank wheel 302 continues to rotate about the center axis 305.

Figure 3C:
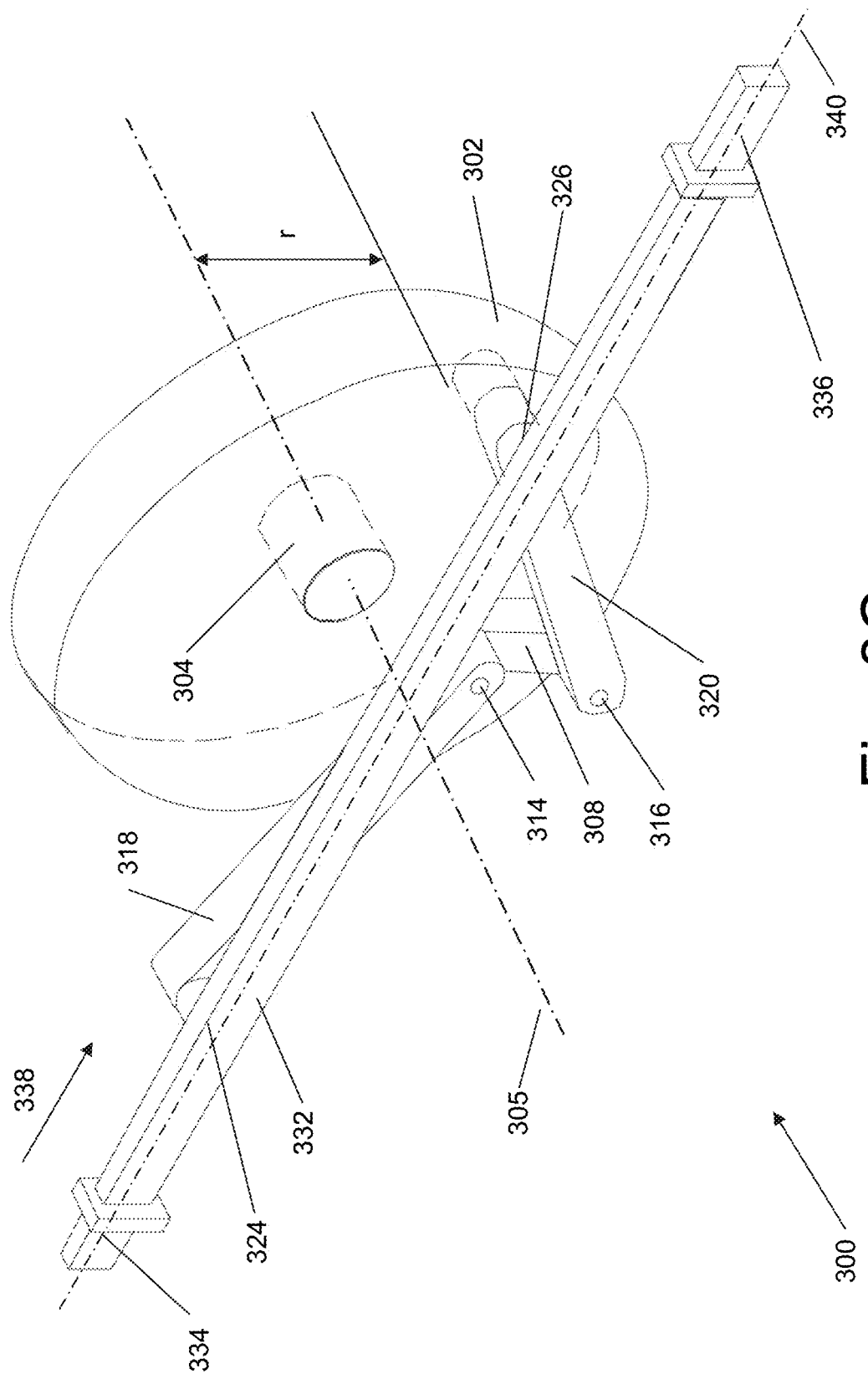
FIG. 3C is an isometric view of one embodiment of a crankshaft system, where the crankshaft is rotated at a third angle.

In FIG. 3C, the crank wheel 302 has been rotated until the crank wheel pin 306 or the angle α is approximately 370 degrees from TDC. As illustrated in FIG. 3C, although the longitudinal axis of the crank wheel pin 306 is approximately −90 or 270 degrees from the longitudinal axis 340, the member 308 may be skewed due to the geometric constraints of the system 300 and/or the imbalance of forces from the first connecting rod member 318 and the second connecting rod member 320.

Figure 3D:
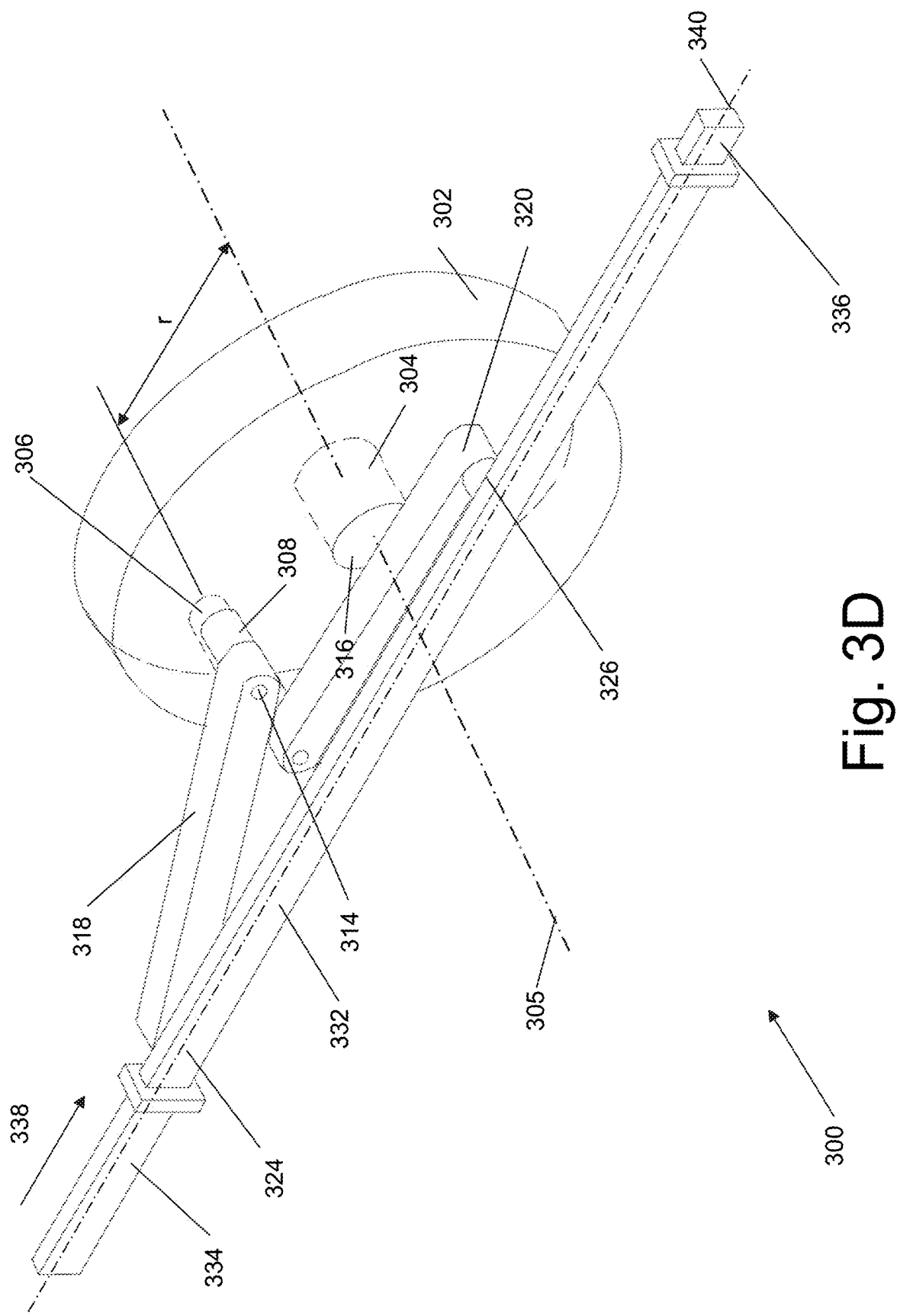
FIG. 3D is an isometric view of one embodiment of a crankshaft system, where the crankshaft is rotated at a fourth angle.

As the opposing force continues to be applied on the second piston pin 326 and the momentum of the crank wheel continues to rotate the crank wheel 302, the crank 302 is rotated to the configuration illustrated in FIG. 3D where the crank wheel pin 306 is now aligned with the longitudinal axis 340 at TDC. The momentum of the crank wheel 302 causes the crank wheel pin 306 to continue to rotate about the center axis 305. Additionally, a force in the direction of 338 may also be applied on the first piston pin 324 (either before or after the crank 302 has been aligned with the longitudinal axis 340). The applied force is transferred to the first connecting rod member 318, which in turn transfers a force to the load transfer member 308. Because the load transfer force member 308 is coupled to the crank wheel 302 via the crank wheel pin 306, the crank wheel 302 continues to rotate about the center axis 305. In FIG. 3D, the crank wheel 302 has been rotated until the crank wheel pin 306 is approximately 360 degrees from TDC or aligned with the longitudinal axis 340. As illustrated in FIG. 3D, although the center axis of the crank wheel pin 306 is approximately aligned (or intersects) with the longitudinal axis 340, the member 308 may be skewed due to the geometric constraints of the system 300. As the member 308 continues to rotate about the center axis 305, the crank wheel 302 will be rotated until the crank wheel pin 306 is once again 90 degrees from the longitudinal axis 340 as illustrated in FIG. 3A. The process then repeats itself in an almost harmonic manner.

Figure 5:
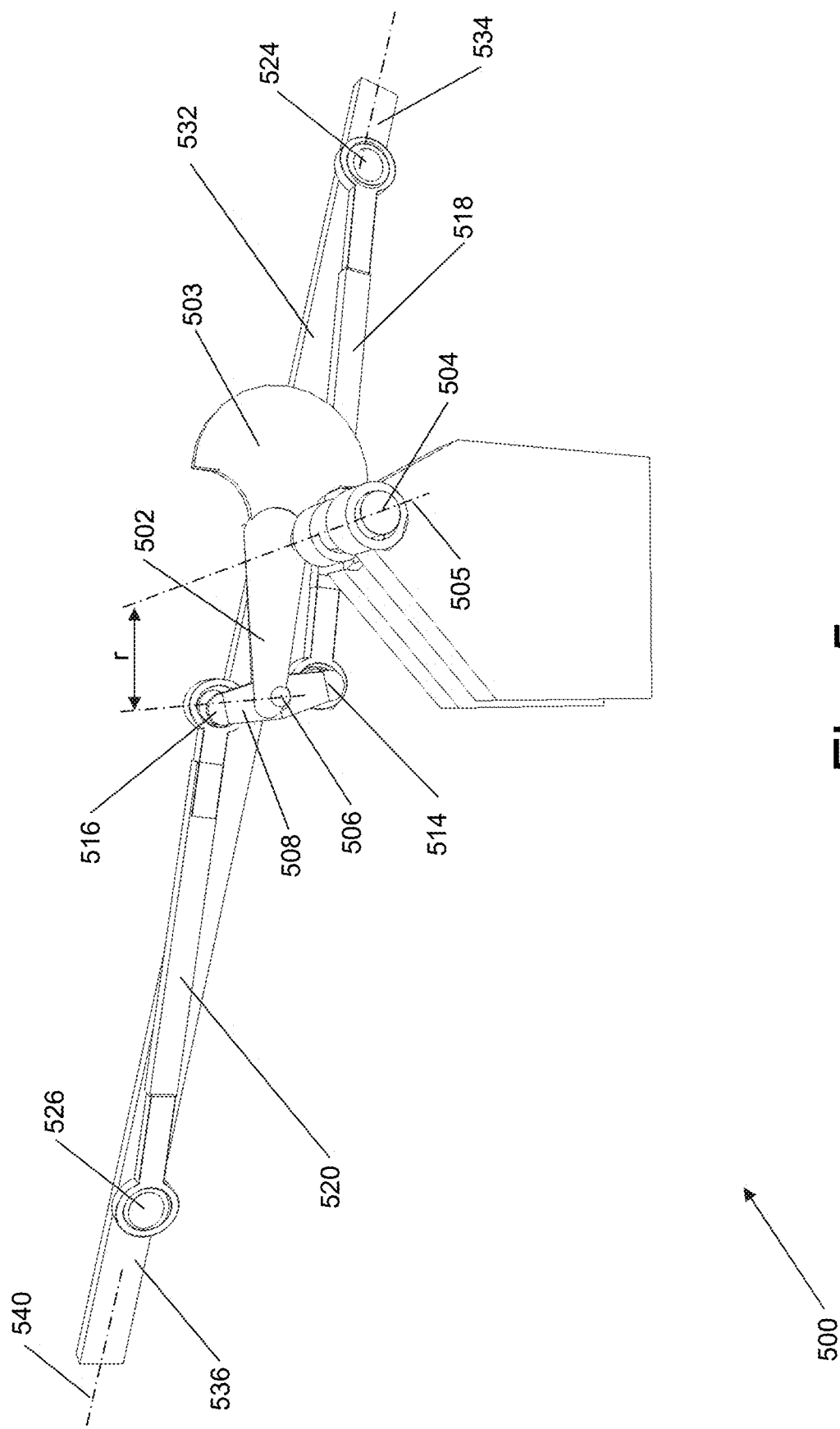
FIG. 5 is a perspective view of one embodiment of a crankshaft system, where the crankshaft is rotated at a first angle.

Turning now to FIG. 5, there is a perspective view of the system 500. The system 500 is conceptually similar to the systems 200 and 300 discussed above. However, the crank wheel 302 in system 300 has been replaced by a crank or crank member 502 coupled to a counter weight 503 for assisting with the momentum as discussed above. In certain embodiments, a shaft or crankshaft 504 can also be concentrically positioned about a center axis 505 and fixedly coupled to the crank 502 such that the crank 502 rotates about the center axis. In certain embodiments, the crank shaft 504 may also be fixedly coupled to the counter weight 503.

An interior or crank pin 506 is rotatably positioned in proximity to an exterior end of the crank 502 with its axis of rotation positioned at a radius "r" with respect to the center axis 505 (which corresponds to the length "r" of the crank 102 or 202 of FIGS. 1 and 2). The crank pin 506 is rotatably coupled to a load transfer member 508 at approximately at the midpoint of the load transfer member. A first end of the load transfer member 508 may be rotatably coupled to a first connecting rod member 518 via a connecting pin 514. The opposing end or second end of the load transfer member 508 may be coupled to a second connecting rod member 520 via a connecting pin 516.

An external or piston end of the connecting rod 518 may be rotatably coupled to a first piston pin 524, which in turn may be coupled to a stabilizing member 532 which in turn may be coupled to a piston or either a driving device or a driven device (not shown). For instance, a first end 534 of the stabilizing member 532 may couple to a piston (not shown). In either case, the piston pin 524 is laterally restrained by the stabilizing member 532 and thus may only travel along a direction parallel to the longitudinal axis 540 of the stabilizing member. Similarly, the external or piston end of the second connecting rod 520 may be rotatably coupled to a second piston pin 526, which in turn may be coupled to the stabilizing member 532. A second or opposing end 536 of the stabilizing member 532 in turn may be coupled to another piston or either a driving device or a driven device (not shown). In either case, the piston pin 526 is also laterally restrained and thus may only travel in along a direction parallel to the longitudinal axis 540 of the stabilizing member 532.

Figure 6A:
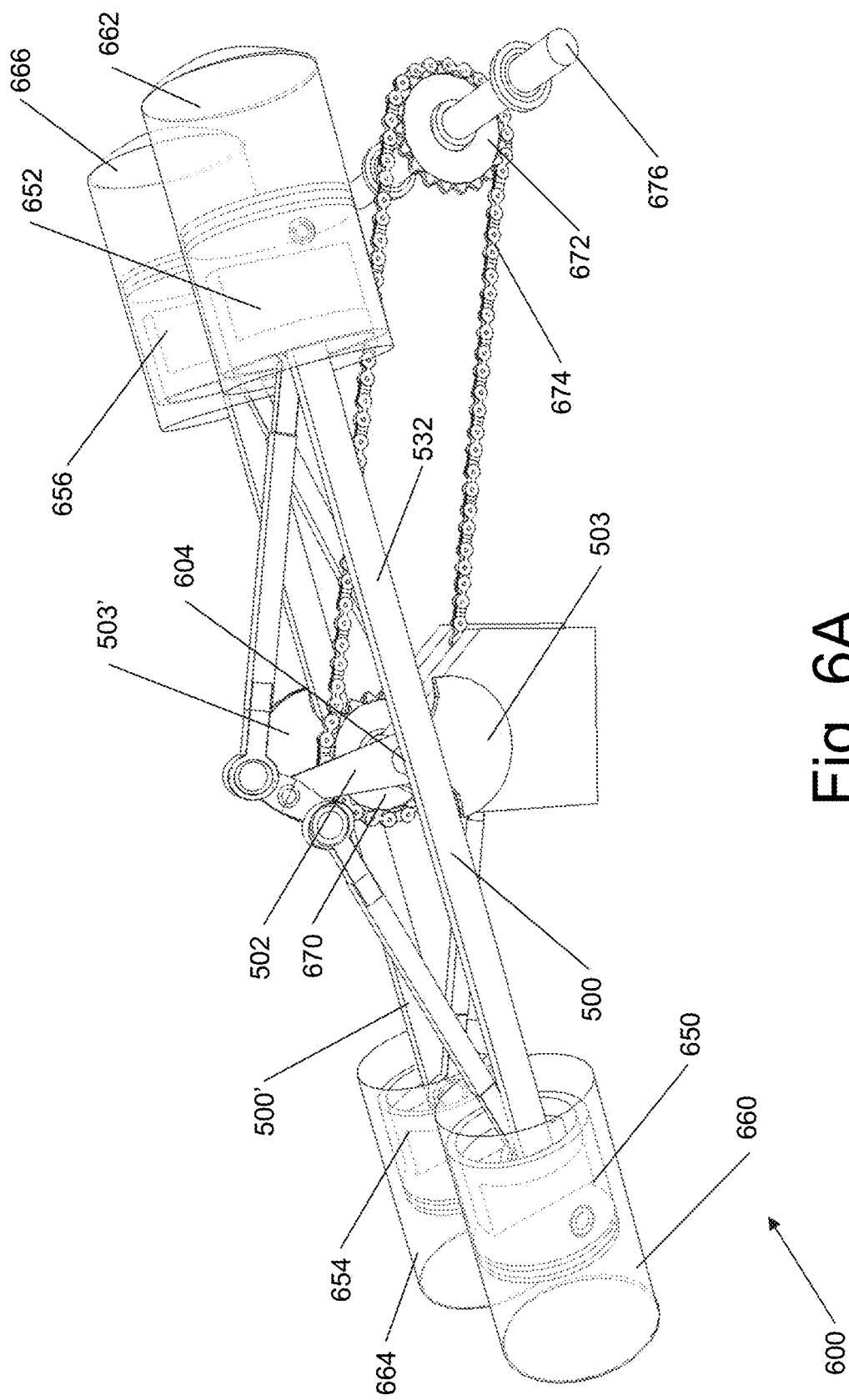
FIG. 6A is a perspective view from a first side of a portion of an engine using a crankshaft system, where the crankshaft is rotated at a first angle.
Figure 6B:
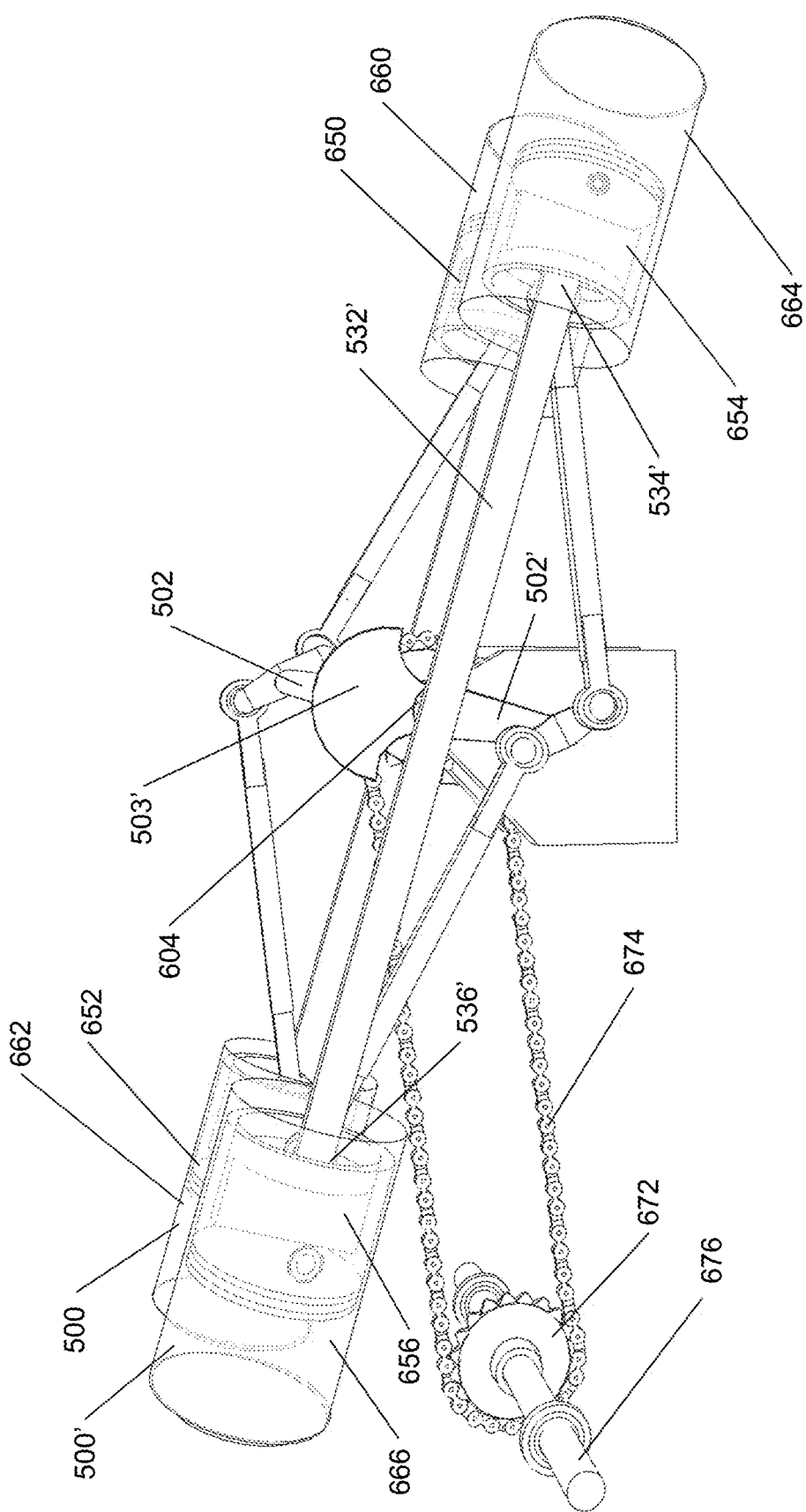
FIG. 6B is a perspective view from a second side of a portion of an engine using the crankshaft system of FIG. 6A, where the crankshaft is rotated at a first angle.

Turning now to FIGS. 6A through 6F, there are different perspective views of a system 600. The system 600 is conceptually similar to the system 500 discussed above except that two systems 500 and 500' have been joined together through a common rotatable shaft or crankshaft 604 which is shared by both systems 500 and 500'. Thus, the system 600 employs the above crank principles in a "flat four" cylinder arrangement. However, the crank 502 and counter weight 503 of the first system 500 is radially positioned or rotated approximately 180 degrees from the crank 502' and 503' of the second system 500' as illustrated in FIGS. 6A and 6B.

Figure 6C:
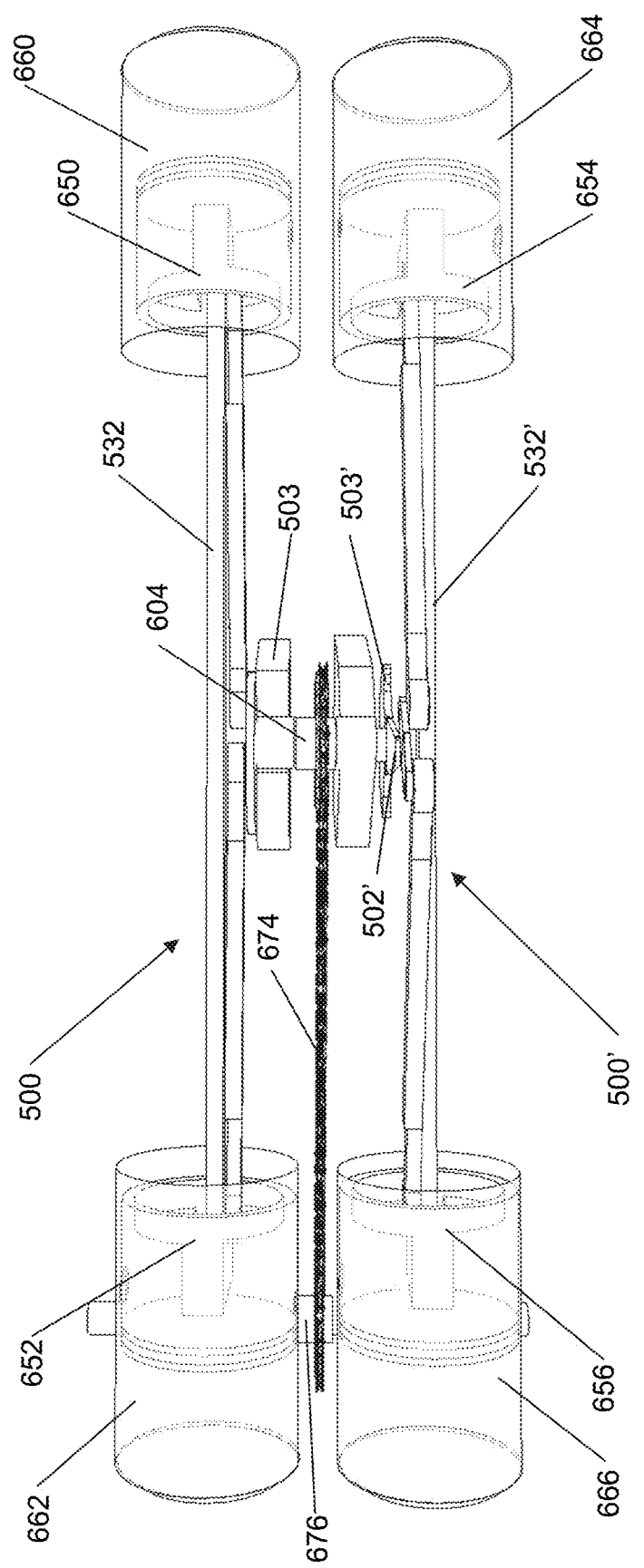
FIG. 6C is a perspective view from a top side of a portion of an engine using the crankshaft system of FIG. 6A, where the crankshaft is rotated at a first angle.

FIG. 6A is a perspective view of the system 600 from a first side primarily showing the system 500. FIG. 6B is a perspective view of the system 600 from a second side primarily showing the system 500'. FIG. 6C is a perspective view of the system 600 from a top view showing both the system 500 and the system 500'. The position of the system 600 in FIGS. 6A through 6C is that the cranks 502 and 502' are radially opposed to each other and are substantially normal to the longitudinal axis of the stabilizing members.

As illustrated, the end 534 of the stabilizing member 532 is coupled to a piston 650 which has been positioned within a cylinder 660. Similarly, the end 536 of the stabilizing member 532 is coupled to a piston 652 which has been positioned within the cylinder 662. An end 534' of the stabilizing member 532' of the system 500' is coupled to a piston 654 which has been positioned within a cylinder 664 (See FIG. 6B). Similarly, the end 536' is coupled to a piston 656 which has been positioned with the cylinder 666 (See FIG. 6B).

In the system 600, the crankshaft 604 is fixedly coupled to a drive sprocket 670. The drive sprocket 670 is mechanically coupled to a driven sprocket 672 via a drive chain 674. The driven sprocket 672 may be coupled to a driven shaft 676 which may be coupled to or be part of an axle or other driven mechanism (not shown). Thus, the drive chain 674 transfers the rotational force produced by the system 600 to the driven shaft 676.

Figure 6D:
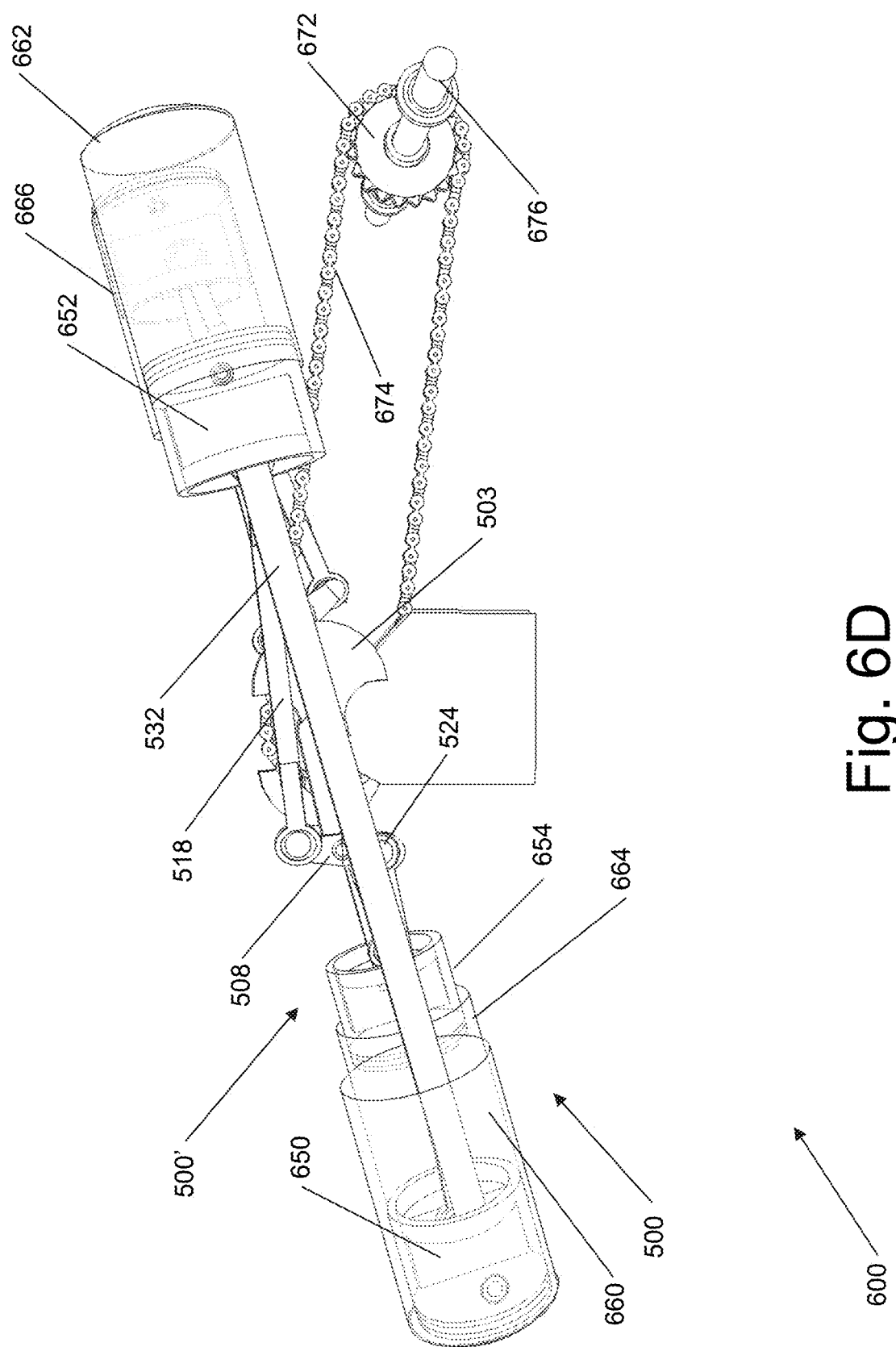
FIG. 6D is a perspective view from a first side of a portion of an engine using the crankshaft system of FIG. 6A, where the crankshaft is rotated at a second angle.
Figure 6E:
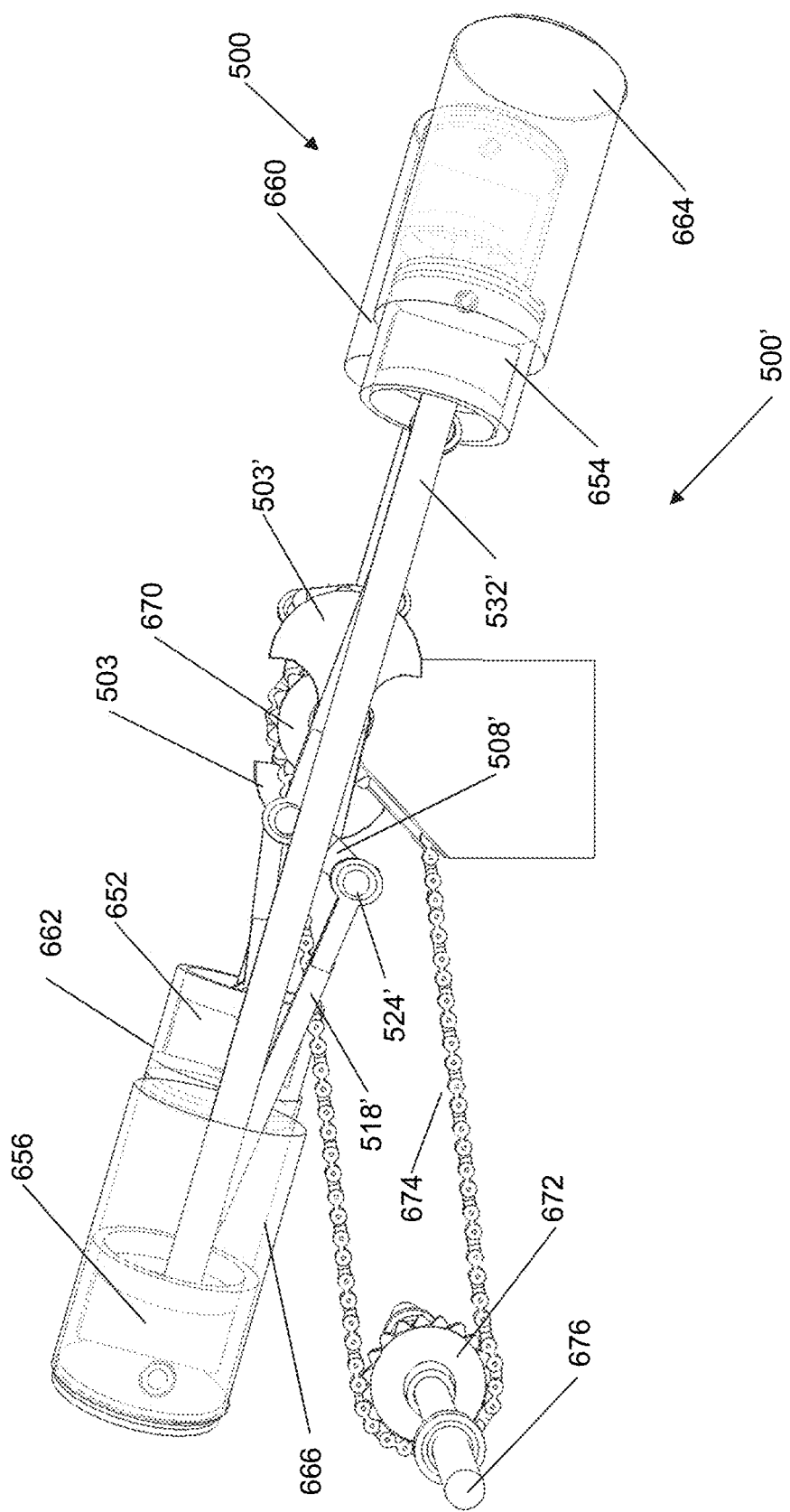
FIG. 6E is a perspective view from a second side of a portion of an engine using the crankshaft system of FIG. 6A, where the crankshaft is rotated at a second angle.
Figure 6F:
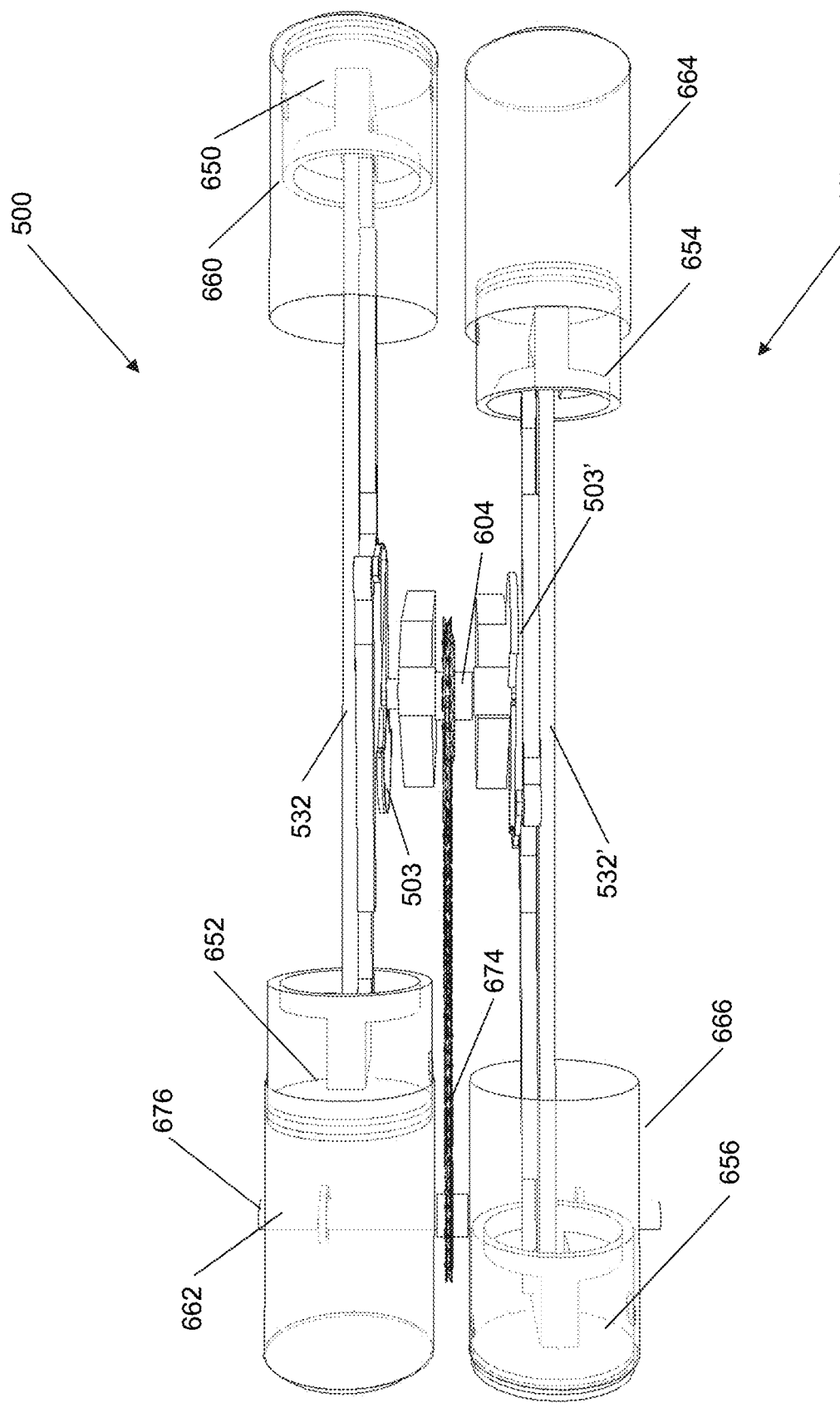
FIG. 6F is a perspective view from a top side of a portion of an engine using the crankshaft system of FIG. 6A, where the crankshaft is rotated at a second angle.

FIG. 6D is a perspective view of the system 600 from a first side primarily showing the system 500. FIG. 6E is a perspective view of the system 600 from a second side primarily showing the system 500'. FIG. 6F is a perspective view of the system 600 from a top view showing both the system 500 and the system 500'. In FIGS. 6A to 6B, the system 600 is illustrated where the pistons 650, 652, 654, and 656 are approximately mid-stroke or midway within their respective cylinders 660, 662, 664, and 666. In contrast, in FIGS. 6D to 6F, the system 600 is illustrated where the pistons 650 and 656 are at the top of their strokes or at the top of their respective cylinders 660 and 666. Because the cranks 502 and 502' (not visible in FIGS. 6D to 6F) are radially opposed to each other, the pistons 652 and 654 are at the bottom of their strokes or at the bottom of their respective cylinders 662 and 664.

In an engine, the fuel in the cylinders 660 and 666 would ignite in a conventional manner, the resulting pressure in these cylinder causes the pistons 650 and 656 to move in opposite directions towards the center of the system 600. The movement of the pistons 650 and 656 exerts a lateral force on the ends of the stabilizing members 532 and 532', which in turn exerts a lateral force on their respective connecting members 518 and 518' via the piston or connecting pins 524 and 524'. The connecting members 518 and 518' then rotate their respective cranks 502 and 502' via the load transfer members 508 and 508' as explained above in reference to the system 500 and the system 300 explained above.

The cylinder arrangement employed by the system 600 is a "flat four" cylinder arrangement system or "flat four" engine. As one skilled in the art would recognize, the above crank systems may be employed in any cylinder arrangement, from a "flat one" to "flat twelve" or more cylinders depending on the design parameters. Furthermore, the above crank systems may be employed in other cylinder configurations such as a straight 4, straight 6, slant 4, slant 6, v6, v8, and v12. The number of cylinders and the configuration of the cylinders depend on the design parameters to be employed for a specific situation.

Turning back to FIG. 6A and FIG. 6D, note that the stabilizing member 532 would interfere with the crankshaft 604 if the crankshaft 604 were to be extended for a flat six or flat eight engine. Such interference can be addressed by using a slotted stabilizing member, such as a slotted stabilizing member 732 or 832 illustrated and discussed in reference to FIG. 8C below. Additional counter weight interference may be addressed in certain embodiments, by coupling additional systems together at other points besides around the common crankshaft axis of crankshafts 704 and 704'.

For instance, in FIG. 7, there is presented a perspective view of a system 700. The system 700 is conceptually similar to the system 600 discussed above except that the system 700 comprises two, flat four engine portions to create a single flat eight cylinder configuration. The system 600 discussed above and a similar system 600' have been joined together through a common rotatable coupling shaft 780 to form the single system 700. An interior facing stabilizing member 732 is slotted to allow movement relative to the crankshaft 704. Similarly, a second interior facing stabilizing member 732' is also slotted to allow movement relative to the crankshaft 704.

The rotatable coupling shaft 780 couples the load transfer member 508 from the system 600 to a similarly configured load transfer member 508' from the system 600'. Thus, the coupling shaft 780 is shared by both subsystems 600' and 600. Other embodiments may join the crankshaft 704 of system 600 to the crankshaft 704' of system 600'.

Turning now to FIG. 8A, there is a perspective view of an alternative embodiment for a crankshaft, crank, and counterweight. In the alternative embodiment illustrated in FIG. 8A, the crankshaft has been replaced by a first crankshaft portion 804*a* and a second crankshaft portion 804*b*. The crankshaft portions 804*a* and 804*b* may rotate about a common center or longitudinal axis 805, but otherwise remain fixed by one or more supports (not shown). An inward or interior end of the crankshaft portion 804*a* is fixedly coupled to an interior end of the first crank 802*a*. The crank 802*a* also rotates about the center axis 805. An opposing or exterior end of the crank 802*a* couples to a load transfer member 808 via an interior or crank pin 806 such that the load transfer member 808 can rotate with respect to the crank 802*a*. A first counterweight 803*a* opposes the crank 802*a* and is also fixedly coupled to the crankshaft portion 804*a* to provide for momentum as discussed above with respect to other embodiments.

Similarly, an inward or interior end of the second crankshaft portion 804*b* is fixedly coupled to an interior end of the second crank 802*b*. The second crank 802*b* also rotates about the center axis 805. An opposing or exterior end of the second crank 802*b* couples to the load transfer member 808 via the crank pin 806 such that the load transfer member 808 can rotate with respect to the second crank 802*b*. A second counterweight 803*b* opposes the crank 802*b* and is also fixedly coupled to the crankshaft portion 804*b* to provide for momentum as discussed above with respect to other embodiments.

One advantage to using two crankshaft portions 804*a* and 804*b* and two cranks 802*a* and 802*b* is that the connecting rods may be placed between the two crankshaft portions, the two cranks, and the two counterweights for more even distribution of torque and momentum. As illustrated in FIG. 8B, the crank pin 806 is rotatably coupled to the load transfer member 808 at approximately at the midpoint of the load transfer member. However, as discussed above, the crank pin 806 may be offset from the center to increase torque if desired. A first end of the load transfer member 808 may be rotatably coupled to a first connecting rod member 818 via a connecting pin 814. The opposing end or second end of the load transfer member 808 may be coupled to a second connecting rod member 820 via a connecting pin 816. As illustrated a portion of the second connecting rod member 820 is positioned between the crank 802a and the crank 802b.

Figure 8C:
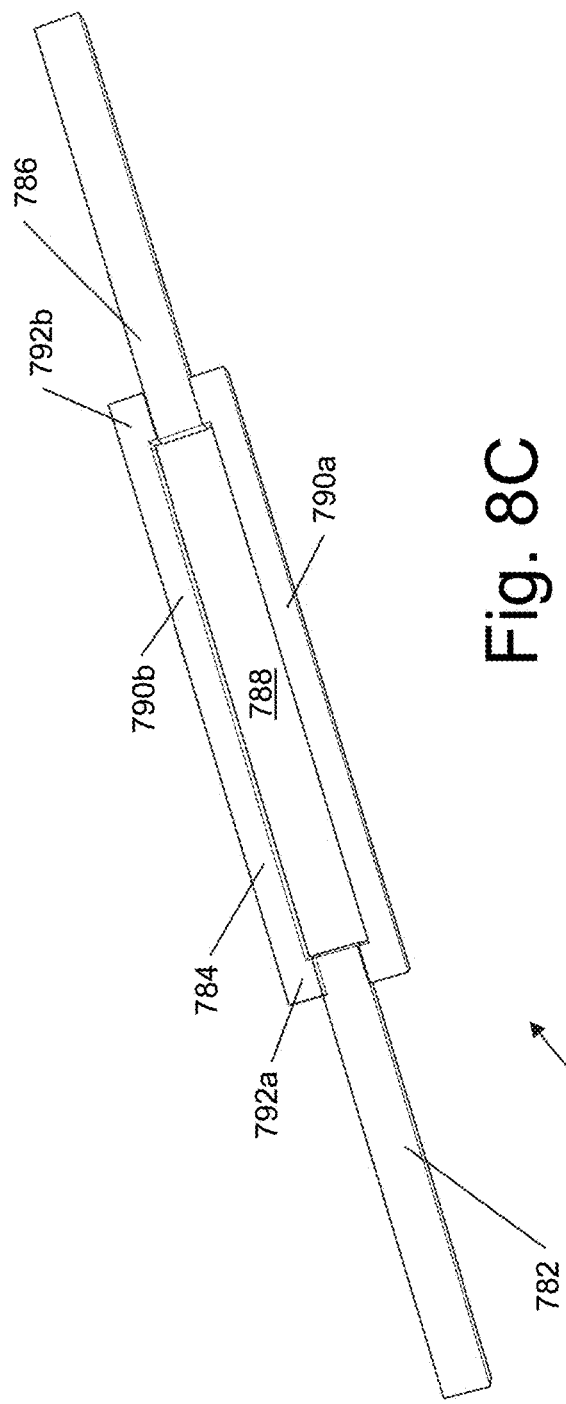
FIG. 8C is a portion of an alternative embodiment.

FIG. 8C illustrates an embodiment of a slotted stabilizing member 732 or 832. In the illustrative embodiment, the stabilizing member 832 comprises three sections: a first end section 782, a middle or intermediate section 784, and a second end section 786. A longitudinal slot 788 is defined within the middle section 784. The longitudinal slot 788 has a width and depth to allow the stabilizing member 832 to clear the crankshafts 804a or 804b when the stabilizing member is in motion relative to the crankshafts.

In certain embodiments, the middle section may comprise two longitudinal members 790a and 790b which are in parallel to each other joined by two end members 792a and 792b which couple the longitudinal members together in addition to coupling the middle section 784 to the respective end section 782 or 786.

Figure 8D:
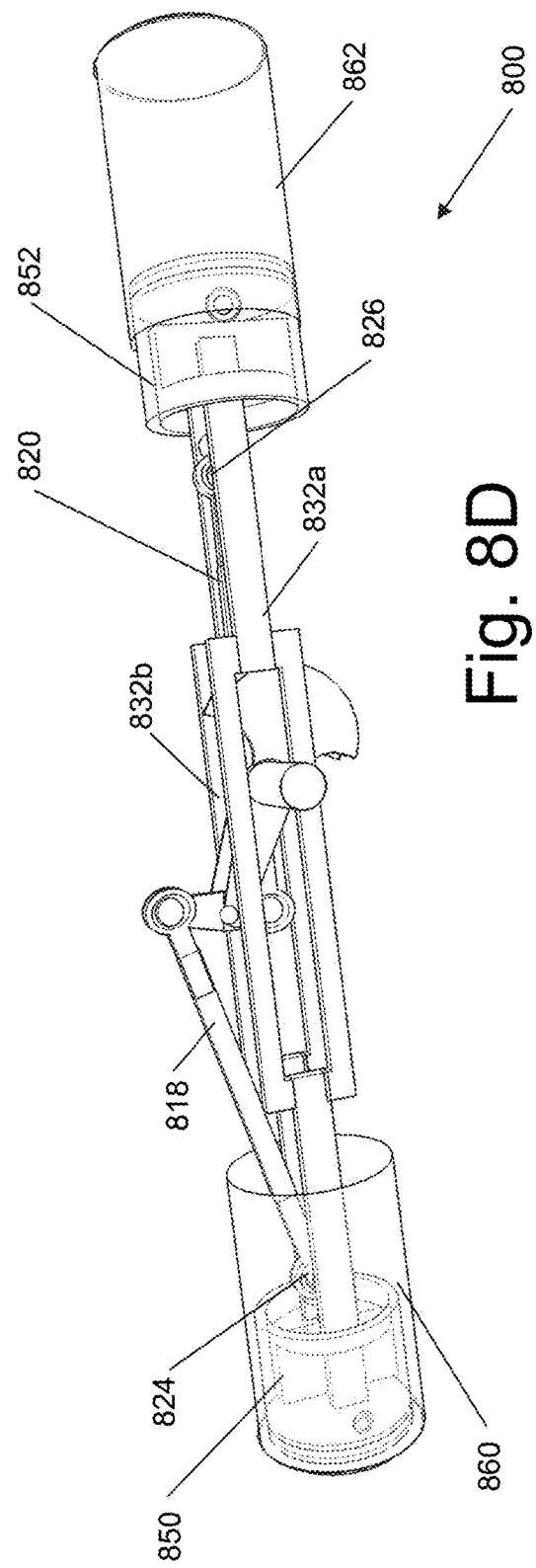
FIG. 8D is an alternative embodiment incorporating the portions of FIGS. 8A through 8C.

FIG. 8D illustrates a system 800 using two slotted stabilizing members 832a and 832b coupled to a first piston 850 on one end of the system and a second piston 852 on the opposing end of the system. The pistons 850 and 852 are designed to mate with two cylinders 860 and 862, respectively which are positioned a "flat" configuration and may be part of an engine block (not shown).

An external or piston end of a connecting rod 818 may be rotatably coupled to a first piston pin 824, which in turn may be coupled to the first stabilizing member 832a and the second stabilizing member 832b. Similarly, the external or piston end of the second connecting rod 820 may be rotatably coupled to a second piston pin 826, which in turn may be rotatably coupled to the first stabilizing member 832a and the second stabilizing member 832b. Both the first connecting rod member 818 and the second connecting rod member 820 share the load on the load transfer force member 808 in a lateral direction. One rod member is pushing and the other rod member is pulling. This limits the applied force on each pivot point while transferring the full force to the crankshaft portions 804a and 804b.

The piston pins 824 and 826 are laterally restrained by the stabilizing members 832a and 832b. Thus, they may only travel along a direction that is parallel to longitudinal axes of the stabilizing members.

FIG. 9A is an isometric view of the crankshaft system 800 where the crankshaft portions 802a and 802b are rotated to a first angle relative to TDC. As illustrated, the pistons 850 and 852 are approximately positioned midway within their respective cylinders 860 and 862. FIG. 9B is another isometric view of the crankshaft system 800, where the portions 802a and 802b are rotated to a second angle relative to TDC and piston 852 is at the top of the cylinder 862 while piston 850 is at the bottom of the cylinder 860. FIG. 9C is an isometric view of the crankshaft system 800, where the crankshaft portions 802a and 802b are rotated to a third angle relative to TDC and the pistons 850 and 852 are approximately positioned midway within their respective cylinders 860 and 862. FIG. 9D is an isometric view of one embodiment of a crankshaft system, where the crankshaft portions 802a and 802b are rotated to a fourth angle relative to TDC and piston 852 is at the bottom of the cylinder 862 while piston 850 is at the top of the cylinder 860.

Turning to FIG. 9A, a driving member such as the first piston 850 within the cylinder 860 may be coupled to the piston ends of the stabilizing members 832a and 832b. As the fuel in the cylinder 860 ignites in a conventional manner, the pressure in the cylinder causes the piston 850 to move in a direction 838. The movement of the piston 850 in the direction 838 exerts a lateral force on the ends of the stabilizing members 832a and 832b, which in turn exerts a lateral force on the first connecting member 818 via the piston or connecting pin 824. The connecting member 818, in turn transfers a force to the load transfer member 808 via a connecting pin 814. Because the load transfer force member 808 is coupled to the cranks 802a and 802b via the crank pin 806, the cranks 802a and 802b also rotate with respect to the center axis 805 of the crankshafts 804a and 804b. As illustrated, the cranks 802a and 802b have rotated at an angle which is approximately 90 degrees from TDC.

In contrast, in FIG. 9B, the cranks 802a and 802b and the crank pin 806 have been rotated until the angle of rotation is almost 180 degrees from the TDC. As illustrated in FIG. 9B, although the crank pin 806 is almost aligned with the longitudinal axes of the stabilizing members 832a and 832b, the load transfer member 808 may be skewed due to the geometric constraints of the system 800.

The momentum of the counterweights 803a and 803b cause the cranks 802a and 802b (and the crank pin 806) to continue to rotate about the center axis 805 pushing the piston 852 close to the top of the second cylinder 862. As the fuel in the second cylinder 862 ignites, the pressure in the second cylinder causes the second piston 852 to move in opposite or opposing the direction 838. The opposite movement of the second piston 852 in the opposing direction exerts a lateral opposing force on the end 836 of the stabilizing members 832a and 832b, which in turn exerts a lateral opposing force on the second connecting member 820 via the piston or connecting pin 826. In turn, the second connecting member 820 transfers a force to the load transfer member 808 via the connecting pin 816. Because the load transfer force member 808 is coupled to the cranks 802a and 802b, the cranks continue to rotate about the axis 805.

In FIG. 9C, the cranks 802a and 802b have been rotated until the crank pin 806 is approximately 270 degrees from TDC or the longitudinal axis of the stabilizing members. As illustrated in FIG. 9C, although the center axis of the crank pin 806 is approximately −90 or 270 degrees from the longitudinal axes of the stabilizing members 832a and 832b, the load transfer member 808 may be skewed due to the geometric constraints of the system 800 and/or the imbalance of forces from the first connecting rod member 818 and the second connecting rod member 820.

As the opposing force continues to be applied on the second piston pin 826 and the momentum of the counter weights 803a and 803b continues to rotate the cranks 802a and 802b, the cranks are rotated to the configuration illustrated in FIG. 9D where the crank pin 806 has been rotated past TDC. The momentum of the crank counterweights 803a and 803b cause the crankshafts 804a and 804b to continue to rotate about the center axis 805. Additionally, a force (from igniting fuel in cylinder 860) in the direction of 838 may also be applied to the first piston pin 850 (either before or after the cranks 802a and 802b have been aligned with TDC). The applied force is transferred to the first connecting rod member 818, which in turn transfers the force to the load transfer member 808 via the connecting pin 814. Because the load transfer force member 808 is coupled to the cranks 802a and 802b via the crank pin 806, the cranks 802a and 802b continue to rotate about the center axis 805.

In FIG. 9D, the cranks 802a and 802b have been rotated until the crank pin 806 is a little past TDC. As illustrated in FIG. 9D, although the longitudinal axis of the crank pin 806 is almost aligned with TDC, the member 808 may be skewed due to the geometric constraints of the system 800. As the member 808 continues to rotate about the center axis 805 of the crankshafts 804a and 804b, the cranks 802a and 802b will be rotated until the crank pin 806 is once again 90 degrees from TDC as illustrated in FIG. 9A. The process then repeats itself in an almost harmonic manner.

Thus, embodiments of the present invention minimize areas of low torque found in traditional crankshaft assemblies which are caused by geometric constraints. Embodiments of the present invention also minimize torque "dead spots" caused by an alignment of the connecting rod to TDC or BDC. Finally, embodiments of this invention increases the overall torque of a motor or engine.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. For the U.S. national phase of this application: when the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The foregoing description of the embodiments of the invention has been presented for the purposes of illustration and description. It is not intended to be exhaustive or to limit the invention to the precise form disclosed. Many combinations, modifications and variations are possible in light of the above teaching. Un-described embodiments which have interchanged components are still within the scope of the present invention. It is intended that the scope of the invention be limited not by this detailed description, but rather by the claims appended hereto.

What is claimed is:

1. A crankshaft assembly comprising:
   a rotatable shaft having a center axis,
   a crank means positioned transversely to the center axis, wherein an interior portion of the crank means is fixedly coupled to the rotatable shaft,
   a load transfer member having a first end connecting pin, a second end connecting pin, and an interior connecting pin, wherein the interior connecting pin is rotatably coupled to the crank means,
   a first connecting rod having exterior end and an interior end, wherein the interior end of the first connecting rod is rotatably coupled to the first end connecting pin,
   a second connecting rod having exterior end and an interior end, wherein the interior end of the second connecting rod is rotatably coupled to the second end connecting pin, and
   wherein a distance between the first end connecting pin and the interior connecting pin of the load transfer member is greater than a distance between the interior connecting pin and the second end connecting pin of the load transfer member.

2. The crankshaft assembly of claim 1, wherein the crank means is a crank member having an interior end and an exterior end positioned transversely to the center axis, wherein the interior end is the interior portion and the exterior end is rotatably coupled to the interior connecting pin of the load transfer member.

3. The crankshaft assembly of claim 2, further comprising a counter weight coupled to the interior end of the crank means.

4. The crankshaft assembly of claim 1, wherein the crank means is a crank wheel.

5. The crankshaft assembly of claim 1, wherein the crank means is a first crank member and a second crank member each having an interior end and an exterior end, wherein each exterior end is positioned transversely to the center axis and each interior end is the interior portion, and each exterior end is rotatably coupled to the interior connecting pin of the load transfer member.

6. The crankshaft assembly of claim 2, further comprising a stabilizing member rotatably coupled to the exterior end of the first connecting rod and rotably coupled to the exterior end of the second connecting rod.

7. The crankshaft assembly of claim 6, wherein the stabilizing member comprises a center bearing portion slidingly coupled to the rotatable shaft.

8. The crankshaft assembly of claim 7, further comprising a second stabilizing member rotatably coupled to the exterior end of the first connecting rod and rotably coupled to the exterior end of the second connecting rod.

9. The crankshaft assembly of claim 8, wherein the second stabilizing member comprises a second center bearing portion slidingly coupled to the rotatable shaft.

10. The crankshaft assembly of claim 1, incorporated into an engine wherein the exterior end of the first connecting rod is rotatably coupled to a first piston and the exterior end of the second connecting rod is rotatably coupled to a second piston.

11. The crankshaft assembly of claim 10, further comprising a second system of claim 1 wherein the crank means of the second system is rotated at an angle of 180 degrees with respect to the first system of claim 1.

12. A method of rotating a crankshaft, the method comprising:
   moving an exterior end of a first connecting rod along a first linear direction,
   moving an interior end of the first connecting rod rotatably coupled to a first connecting pin of a load transfer member,
   rotating the load transfer member about the first end connecting pin of a load transfer member and about an interior connecting pin rotatable coupled to a crank means,
   rotating the crank means about the crankshaft, which in turn rotates the crankshaft about its center axis;
   moving an exterior end of a second connecting rod along the first linear direction,
   moving an interior end of the second connecting rod rotatably coupled to a second connecting pin of the load transfer member,
   rotating the load transfer member about the second end connecting pin of the load transfer member and about the interior connecting pin rotatable coupled to the crank means, rotating the crank means about the crankshaft, which in turn rotates the crankshaft about its center axis; and
moving a stabilizing member coupled to the first connecting rod and the second connecting rod.

* * * * *